United States Patent
Varunjikar et al.

(10) Patent No.: US 10,399,597 B2
(45) Date of Patent: Sep. 3, 2019

(54) PAYLOAD ESTIMATION USING ELECTRIC POWER STEERING SIGNALS

(71) Applicant: STEERING SOLUTIONS IP HOLDING CORPORATION, Saginaw, MI (US)

(72) Inventors: Tejas M. Varunjikar, Rochester Hills, MI (US); Anthony J. Champagne, Saginaw, MI (US); Qi Wang, Sanginaw, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 148 days.

(21) Appl. No.: 15/717,182

(22) Filed: Sep. 27, 2017

(65) Prior Publication Data

US 2018/0015948 A1    Jan. 18, 2018

Related U.S. Application Data

(63) Continuation-in-part of application No. 15/288,265, filed on Oct. 7, 2016, now abandoned.
(Continued)

(51) Int. Cl.
*B62D 5/04* (2006.01)
*B62D 6/10* (2006.01)
(Continued)

(52) U.S. Cl.
CPC ............ *B62D 6/10* (2013.01); *B62D 5/0463* (2013.01); *B62D 5/0481* (2013.01); *B62D 6/00* (2013.01); *B62D 6/008* (2013.01); *B62D 15/02* (2013.01)

(58) Field of Classification Search
CPC ........................... B62D 5/0463; B62D 5/0472
See application file for complete search history.

(56) References Cited

U.S. PATENT DOCUMENTS

| | | | |
|---|---|---|---|
| 5,828,973 | A | 10/1998 | Takeuchi et al. |
| 6,134,490 | A | 10/2000 | Ito et al. |

(Continued)

FOREIGN PATENT DOCUMENTS

| | | | |
|---|---|---|---|
| CN | 1903633 | A | 1/2007 |
| CN | 101395056 | A | 3/2009 |

(Continued)

OTHER PUBLICATIONS

Chinese Office Action dated Feb. 2, 2015 in corresponding CN Application No. 201210597122.4.
(Continued)

*Primary Examiner* — Mussa A Shaawat
*Assistant Examiner* — Abdhesh K Jha

(57) ABSTRACT

Technical solutions are described for a payload detection module that detects payload using one or more steering system control signals and generates an axle load factor. An example payload detection module includes a rack torque module to determine a rack torque, a reference model module to determine a reference rack torque for the steering system based on a load scale factor, and a load factor calculation module to compute the axle load factor based on a difference between the rack torque and the reference rack torque. Further, a blend factor module determines a load blend factor according to the axle load factor. Further yet, a signal combiner combines a blended nominal base assist and a blended highload base assist according to the load blend factor, the combination modifying a motor torque command, the motor torque command being sent to a motor to generate assist torque.

18 Claims, 18 Drawing Sheets

Related U.S. Application Data

(60) Provisional application No. 62/400,808, filed on Sep. 28, 2016, provisional application No. 62/239,578, filed on Oct. 9, 2015.

(51) Int. Cl.
*B62D 15/02* (2006.01)
*B62D 6/00* (2006.01)

(56) References Cited

U.S. PATENT DOCUMENTS

| | | | |
|---|---|---|---|
| 8,434,583 | B2 | 5/2013 | Wilson-Jones et al. |
| 9,278,709 | B2 * | 3/2016 | Champagne ......... B62D 5/0463 |
| 2002/0107621 | A1 | 8/2002 | Byers et al. |
| 2003/0024759 | A1 | 2/2003 | Williams et al. |
| 2003/0150366 | A1 | 8/2003 | Kaufmann et al. |
| 2004/0019417 | A1 | 1/2004 | Yasui et al. |
| 2004/0099469 | A1 * | 5/2004 | Koibuchi ................ B60T 8/175 180/421 |
| 2004/0189228 | A1 | 9/2004 | Katch et al. |
| 2008/0027609 | A1 * | 1/2008 | Aoki ..................... B62D 5/0463 701/43 |
| 2008/0097668 | A1 | 4/2008 | Tsuchiya |
| 2008/0114515 | A1 | 5/2008 | Hara |
| 2008/0142293 | A1 | 6/2008 | Goto et al. |
| 2008/0294313 | A1 | 11/2008 | Aoki et al. |
| 2009/0069981 | A1 | 3/2009 | Barthomeuf et al. |
| 2009/0078494 | A1 | 3/2009 | Dornhege et al. |
| 2009/0192679 | A1 | 7/2009 | Kobayashi et al. |
| 2009/0207043 | A1 | 8/2009 | Shaffer et al. |
| 2009/0271069 | A1 | 10/2009 | Yamamoto et al. |
| 2010/0004824 | A1 * | 1/2010 | Ikeda ................... B62D 5/0463 701/42 |
| 2010/0007200 | A1 | 1/2010 | Pelosse |
| 2010/0292896 | A1 * | 11/2010 | Watanabe ............ B62D 5/0466 701/41 |
| 2011/0093164 | A1 | 4/2011 | Kobayashi |
| 2012/0024038 | A1 | 2/2012 | Von Tardy-Tuch et al. |
| 2012/0083972 | A1 | 4/2012 | Gruener et al. |
| 2012/0191301 | A1 | 7/2012 | Benyo et al. |
| 2012/0323474 | A1 | 12/2012 | Breed et al. |
| 2013/0073146 | A1 | 3/2013 | Konomi et al. |
| 2013/0226408 | A1 | 8/2013 | Fung et al. |
| 2013/0253770 | A1 | 9/2013 | Nishikawa et al. |
| 2013/0261894 | A1 | 10/2013 | Kojima |
| 2014/0230533 | A1 | 8/2014 | Greul et al. |
| 2015/0088380 | A1 | 3/2015 | Gabor et al. |
| 2015/0367884 | A1 | 12/2015 | George et al. |
| 2016/0075371 | A1 | 3/2016 | Varunjikar et al. |
| 2016/0280251 | A1 | 9/2016 | George et al. |

FOREIGN PATENT DOCUMENTS

| | | |
|---|---|---|
| DE | 102009002245 A1 | 10/2010 |
| EP | 1275937 A2 | 1/2003 |
| EP | 1640246 A2 | 3/2006 |
| EP | 2177421 A2 | 4/2010 |
| EP | 2289767 A2 | 2/2011 |
| JP | 2010101746 A | 5/2010 |

OTHER PUBLICATIONS

European Search Report for EP Application No. 12196797.0, dated Jun. 7, 2013, 7 pages.
Office Action dated Apr. 5, 2016.
Office Action dated May 9, 2016.
Office Action dated Sep. 24, 2015.

* cited by examiner

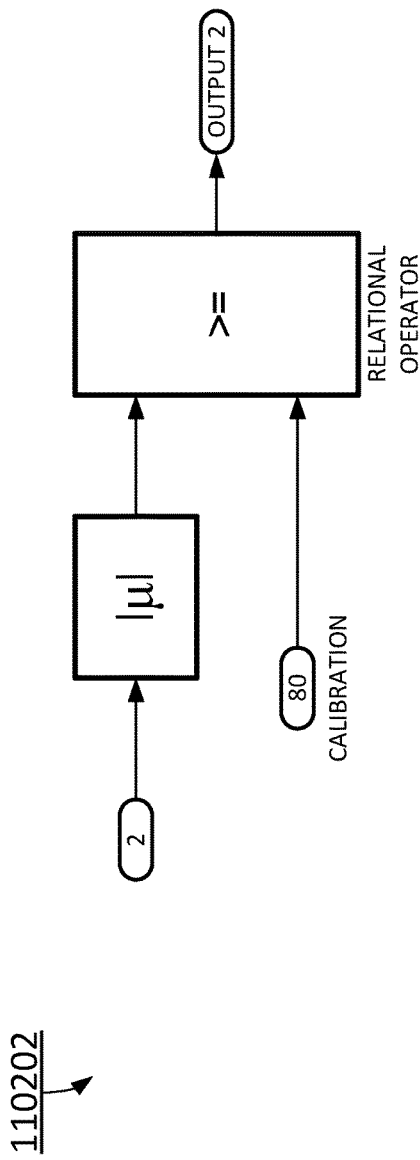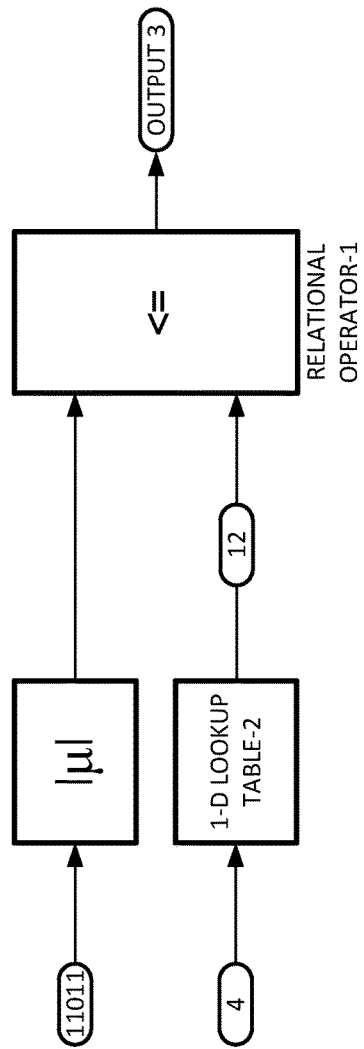

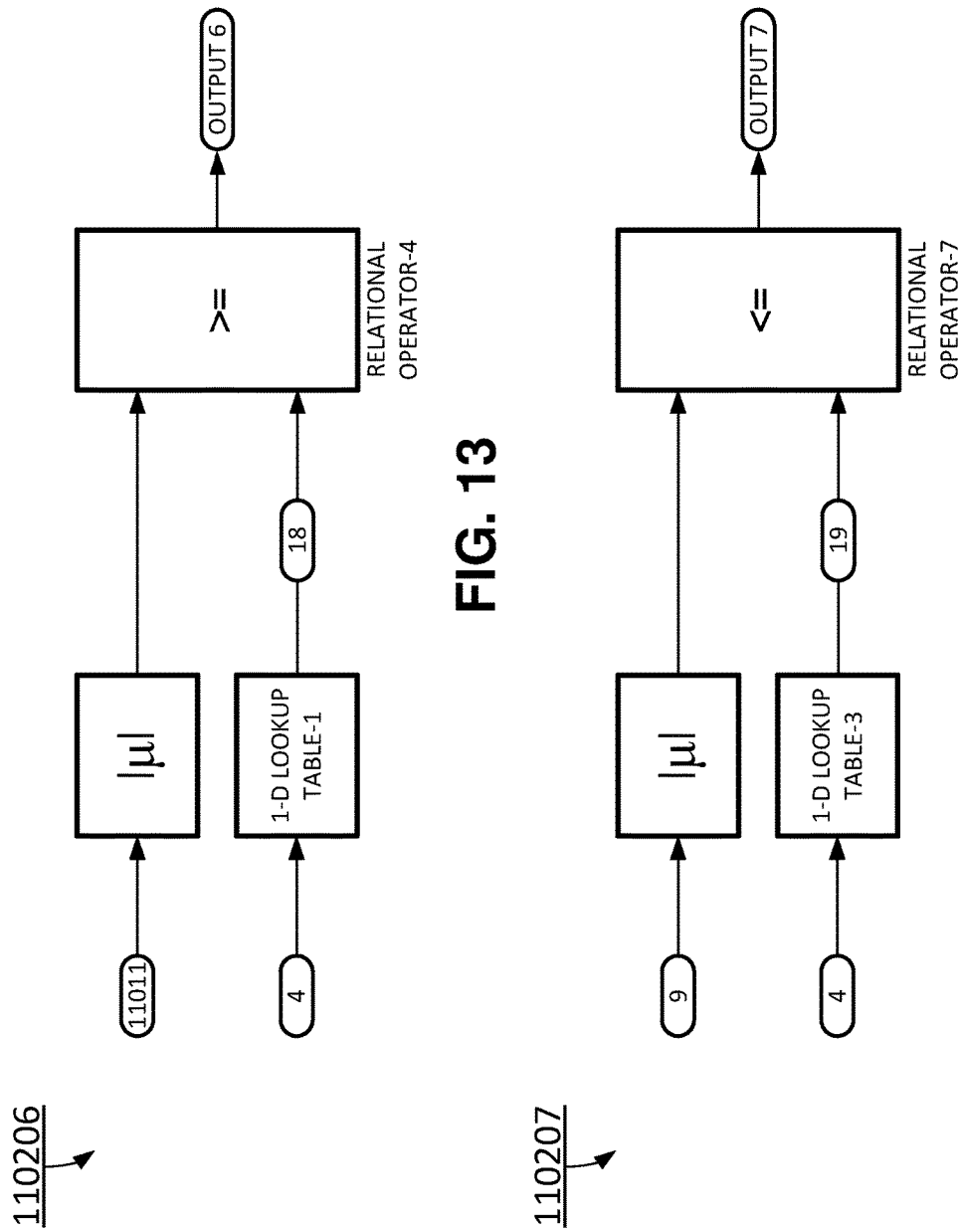

PAYLOAD ESTIMATION USING ELECTRIC POWER STEERING SIGNALS

CROSS-REFERENCES TO RELATED APPLICATIONS

This patent application claims priority to U.S. Provisional Patent Application Ser. No. 62/400,808, filed Sep. 28, 2016, and also as a continuation-in-part of U.S. patent application Ser. No. 15/288,265, filed Oct. 7, 2016, which further claims priority to U.S. Provisional Patent Application Ser. No. 62/239,578, filed Oct. 9, 2015, all of which are incorporated herein by reference in entirety.

BACKGROUND OF THE INVENTION

The invention relates to electrical power steering system, and more particularly to methods and systems for payload estimation using electric power steering signals for consistent steering feel.

Traditional power-assist steering systems, such as Electric Power Steering (EPS) systems, are used in different vehicle classes ranging from light vehicles (small hatchbacks) to heavy vehicles (Pickup trucks, Vans). The electric motor acts as an actuator to assist the vehicle operator while steering the vehicle. Typically, EPS parameters are tuned to give optimal steering feel on various road surfaces for nominal vehicle load conditions. During use of the vehicle, payload may be added or subtracted from the vehicle. This change in payload changes the load, or force, exerted by each tire upon the road, which may significantly change a kingpin torque (and hence change rack load) when compared to the nominal load conditions. Changes in kingpin torque may result in an inconsistent steering effort 'feel' experienced by the operator. That is, the amount of steering effort may change with changes in payload for more traditional EPS systems.

Accordingly, it is desirable to develop an EPS system that is more robust, low cost, and/or may be capable of reducing inconsistencies in steering effort with changes in payload.

SUMMARY

According to one or more embodiments a payload estimation system of an electric power steering (EPS) system includes a payload detection module that detects payload according to one or more EPS signals and generates an axle load factor. The payload detection module includes a rack torque module that determines a rack torque acting on a rack connected with the eps. A reference model module determines a reference rack torque for the eps based on a load scale factor. A load factor calculation module computes an axle load factor based on a difference between the rack torque and the reference rack torque. Further, a blend factor module determines a load blend factor according to the axle load factor. Further yet, a signal combiner combines a blended nominal base assist and a blended highload base assist according to the load blend factor, the combination modifying a motor torque command, the motor torque command being sent to a motor to generate assist torque.

According to one or more embodiments a method of estimating a payload for maintaining a substantially consistent steering feel produced at least in-part by an electric power steering (EPS) system, includes receiving, by a payload detection module of a payload estimation system, a plurality of EPS signals to generate an additional axle load factor. The method also includes determining, by a reference model module, a reference rack torque for the eps based on a load scale factor. The method also includes computing, by a load factor calculation module, an axle load factor based on a difference between the rack torque and the reference rack torque. The method also includes determining, by a blend factor table of the payload estimation system, a load blend factor according to the additional axle load factor. The method also includes modifying, by a merge module, a motor torque command based on the load blend factor, the motor torque command being sent to a motor of the eps to generate assist torque.

According to one or more embodiments a steering system includes a rack torque module that determines a rack torque acting on a rack connected with the steering system. Further, a reference model module determines a reference rack torque for the steering system according to a plurality of control signals. A payload detection module computes an axle load factor based on a difference between the rack torque and the reference rack torque. A signal combiner modifies a motor torque command based on the axle load factor, the motor torque command being sent to a motor of the steering system to generate assist torque.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings. Wherever possible, the same reference numbers are used throughout the drawings to refer to the same or like elements of an embodiment, and wherein:

FIG. 9 is a functional block diagram illustrating a second condition detection logic unit of the reference rack torque model of the payload estimation system in accordance with certain exemplary embodiments of the invention;

FIG. 10 is a functional block diagram illustrating a third condition detection logic unit of the reference rack torque model of the payload estimation system in accordance with certain exemplary embodiments of the invention;

FIG. 13 is a functional block diagram illustrating a sixth condition detection logic unit of the reference rack torque model of the payload estimation system in accordance with certain exemplary embodiments of the invention;

FIG. 14 is a functional block diagram illustrating a seventh condition detection logic unit of the reference rack torque model of the payload estimation system in accordance with certain exemplary embodiments of the invention;

DETAILED DESCRIPTION

Figure 1:
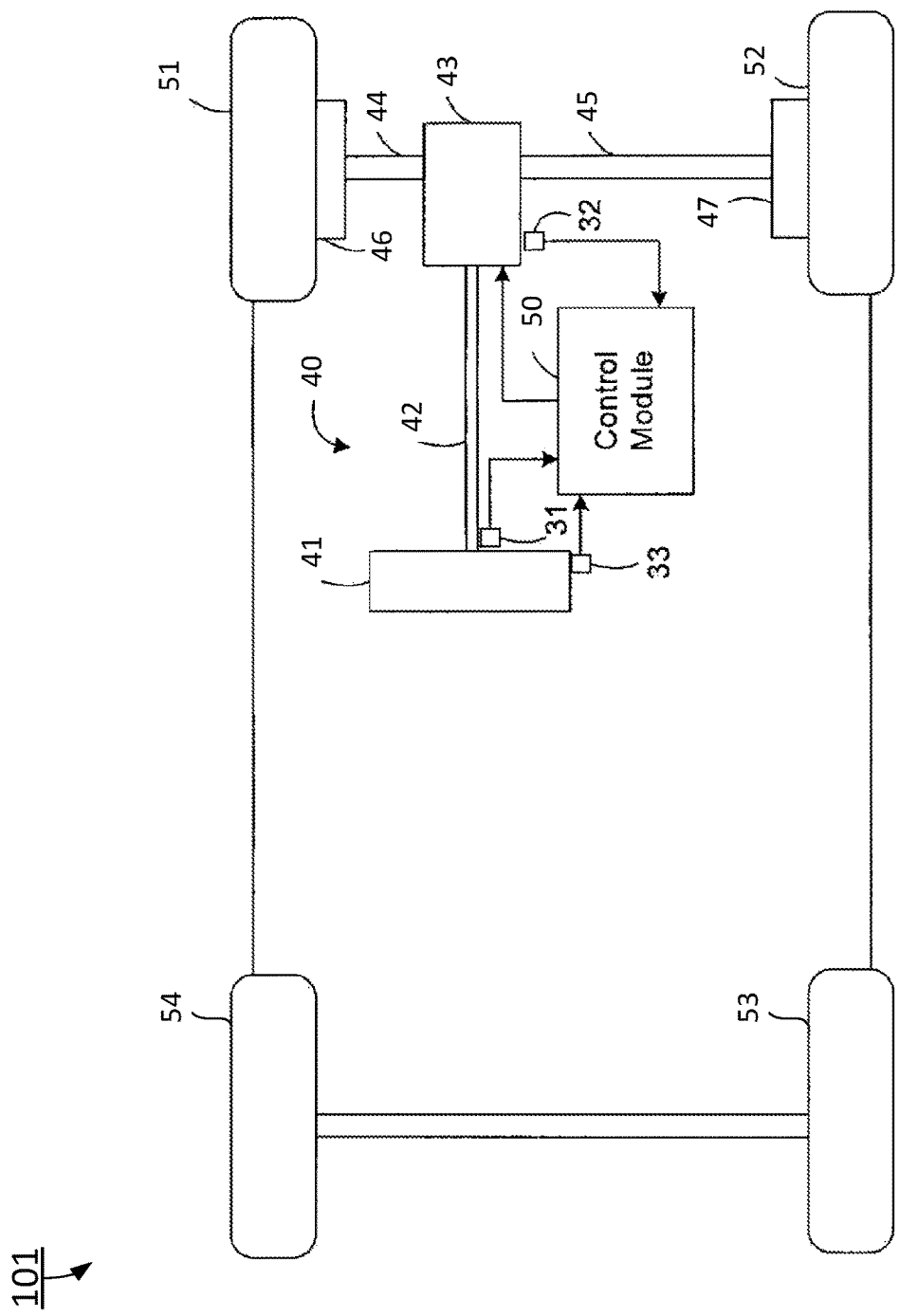
FIG. 1 illustrates a functional block diagram of an electric power steering system that includes a payload estimation system in accordance with certain exemplary embodiments of the invention.

The invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the invention. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The invention will now be described more fully hereinafter with reference to the accompanying drawings FIGS. 1-20, in which certain exemplary embodiments of the invention are shown. The invention may, however, may be embodied in many different forms and should not be construed as limited to the embodiments set forth herein; rather, these embodiments are provided so that this invention will be thorough and complete, and will fully convey the scope of the invention to those skilled in the art.

The present disclosure shall describe a system that estimates an additional axle load factor. This payload detection is then used to blend between, for example, two assist tables. One assist table is designed for nominal loading, and the other assist table is designed for full load. The assist table associated with a full payload may provide additional EPS assist so that there is less variation in operator steering effort with changes in payload. In addition to assist tables, other tuning parameters such as damping may be changed based on the additional axle load factor. The payload estimation may only utilize the EPS system and existing vehicle signals that reducing vehicle cost and complexity.

In one aspect, the invention relates to a payload estimation system 100 for maintaining consistent steering feel using electric power steering (EPS) signals.

Referring now to FIG. 1, where the invention will be described with reference to specific embodiments without limiting same, an exemplary embodiment of a vehicle 101 including an electric power steering (EPS) system 40 is illustrated. In various embodiments, the EPS system 40 includes a hand wheel 41 coupled to a steering shaft 42. In one exemplary embodiment, the steering system 40 is that further includes a steering assist unit 43 that couples to the steering shaft 42 of the steering system 40 and to a first tie rod 44 and a second tie rod 45 of the vehicle 101. The EPS system 40 also includes a control module 50 to electrically control and operate the EPS system 40. The control module 50 may include the payload estimation system 100 to provide assist to the EPS system 40 according to the payload on the vehicle 10.

The steering assist unit 43 includes, for example, a rack and pinion steering mechanism (not shown) that may be coupled through the steering shaft 42 to a steering actuator motor and associated gears (hereinafter referred to as the steering actuator). During operation, as the hand wheel 41 is turned by a vehicle operator (i.e., a driver), the motor of the steering assist unit 43 provides the assistance to move the first tie rod 44 and the and second tie rods 44, 45, which in turn moves respective first and second steering knuckles 46, 47, coupled to respective roadway wheels 51 and 52 of the vehicle 101. Although an EPS system is illustrated in FIG. 1 and described herein, it is appreciated that the steering system 40 of the present disclosure can include various controlled steering systems including, but not limited to, steering systems with hydraulic configurations, and steer-by-wire configurations.

The vehicle 101 may further include a handwheel torque sensor 31, an EPS motor sensor 32, and a handwheel angle sensor 33. These sensors 31-33 detect and measure observable conditions of the steering system 40 and/or of the vehicle 101. In one embodiment, the EPS motor sensor 32 measures motor position. In another embodiment, the EPS motor sensor 32 measures motor velocity. In certain embodiments, the handwheel position and/or the motor position may be used by the payload estimation system 100. The sensors 31, 32, 33 periodically or continuously generate sensor signals based on the observable conditions. In various embodiments, the vehicle 101 may also include one or more vehicle speed sensors to measure or monitor the vehicle speed. In one embodiment, the vehicle speed sensors may be mounted on one or more of the roadway wheels. The roadway wheels may be front road wheels 51 and 52, and/or rear roadway wheels 53 and 54. In one embodiment, at least a portion of the sensors may have redundant or backup sensors to validate or complement the sensor signals. The sensors 31, 32, 33 are configured to output and send the associated signals to the payload estimation system 100.

In various embodiments, the payload estimation system 100 estimates the payload of the vehicle 101, provides estimated payload data to the steering assist unit 43, and may generally control the operation of the steering system 40 and/or the vehicle 101. This control by the payload estimation system 100 may be based on one or more of the enabled sensor signals and/or the estimated payload of the vehicle 101, and further based on assist torque calculation systems and methods of the present disclosure. Generally speaking, the methods and systems in various embodiments of the invention generate an assist torque command without using a hand wheel torque signal, which typically indicates the driver-requested assist, when the hand wheel torque sensor supplying the hand wheel torque signal becomes disabled or faulty. Specifically, the methods and systems may utilize a modified static tire model to estimate rack load or steering torque when the vehicle is stationary or moving at a relatively low velocity (e.g., at about ten kilometers per hour or less). The methods and systems may generate a scale factor based on the hand wheel angle, the hand wheel velocity, the vehicle velocity and a previously generated assist torque command. The methods and systems generate an assist torque command by scaling the estimated steering rack force with the scale factor.

Figure 2:
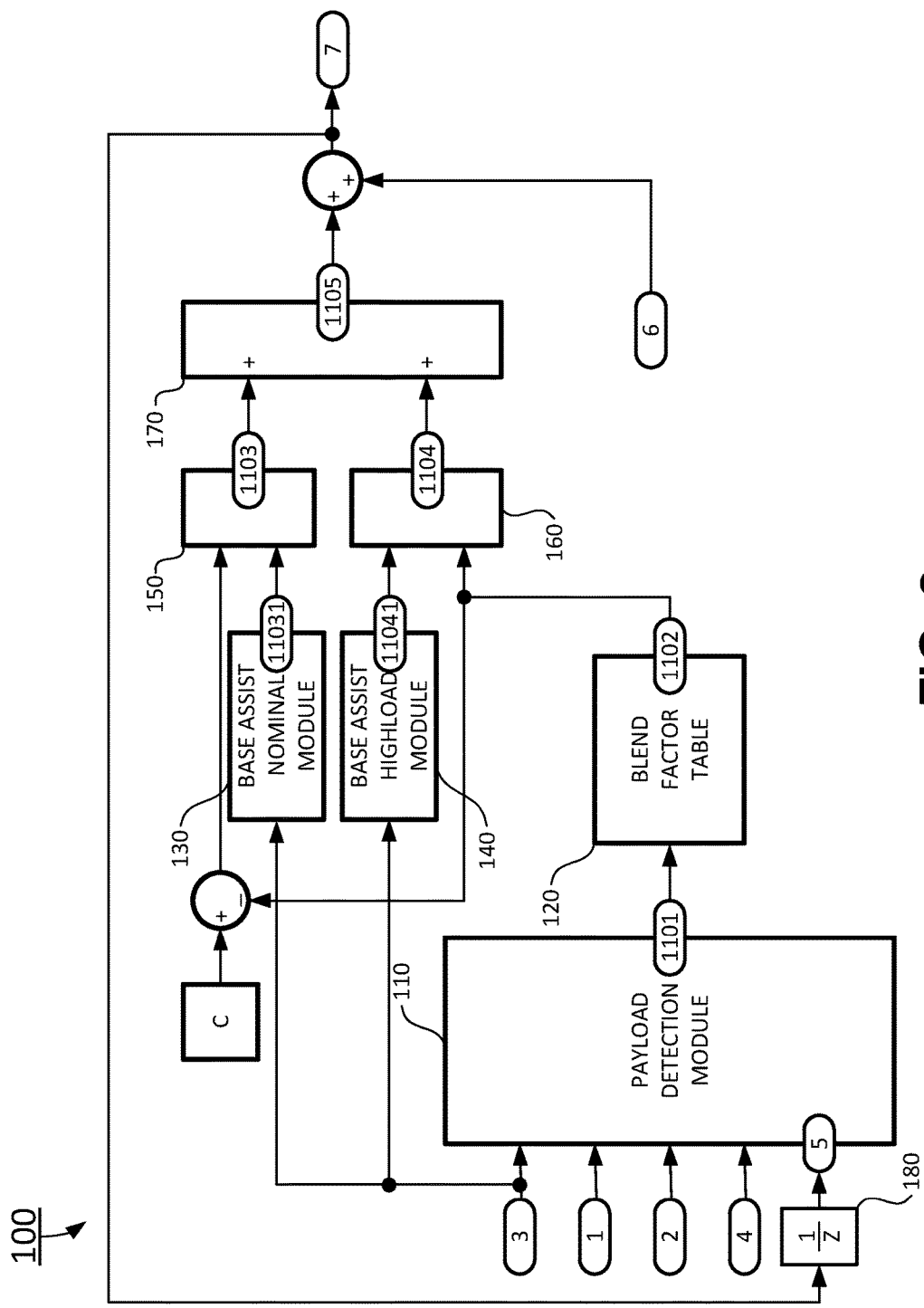
FIG. 2 is a functional block diagram illustrating a payload estimation system using electric power steering signal in accordance with certain exemplary embodiments of the invention.

FIG. 2 depicts a functional block diagram illustrating the payload estimation system 100 using electric power steering signals. In certain embodiments, the payload estimation system 100 includes one or more sub-modules and datastores, such as a payload detection module 110, a blend factor lookup table 120, a nominal base assist module 130, a highload base assist module 140, and a signal combiner 170. The payload detection module 110 detects payload according to multiple EPS signals, and generates an additional axle load factor 1101. The blend factor lookup table 120 determines a load blend factor 1102 according to the additional axle load factor 1101.

The input to the nominal base assist module 130 is the handwheel torque 3 and the output of the nominal base assist module 130 is a nominal base assist 11031. The nominal base assist 11031 is multiplied by an offset blend factor through a first multiplier 150 to generate a blended nominal base assist 1103. The offset blend factor is generated by offsetting the blend factor 1102 by a predetermined constant C. In one embodiment, the predetermined constant C is 1.

The input to the highload base assist module 140 is also the handwheel torque 3 and the output of the highload base assist module 140 is a highload base assist 11041. The highload base assist 11041 is multiplied by the blend factor 1102 to generate a blended highload base assist 1104.

The signal combiner 170 combines, or blends, the blended nominal base assist 1103 and the blended highload base assist 1104 to generate a motor torque command 7.

As used herein the terms system, unit, module, and sub-module may refer to an application specific integrated circuit (ASIC), an electronic circuit, one or more computer processors (shared, dedicated, or group) and computer writeable and readable memory that executes one or more software or firmware programs, a combinational logic circuit, and/or other suitable components that provide the described functionality. As can be appreciated, the modules shown in FIG. 2 can be combined and/or further partitioned to similarly generate an assist torque command. As can be appreciated, the modules shown in FIG. 2 can be implemented as the single payload estimation system 100 (as shown) or multiple control modules (not shown). Inputs to the payload estimation system 100 can be generated from the various sensors of the vehicle 101 as shown in FIG. 1, can be modeled within the payload estimation system 100 (e.g., by other modules (not shown)), can be received from other control modules (not shown), and/or can be predefined.

Figure 3:
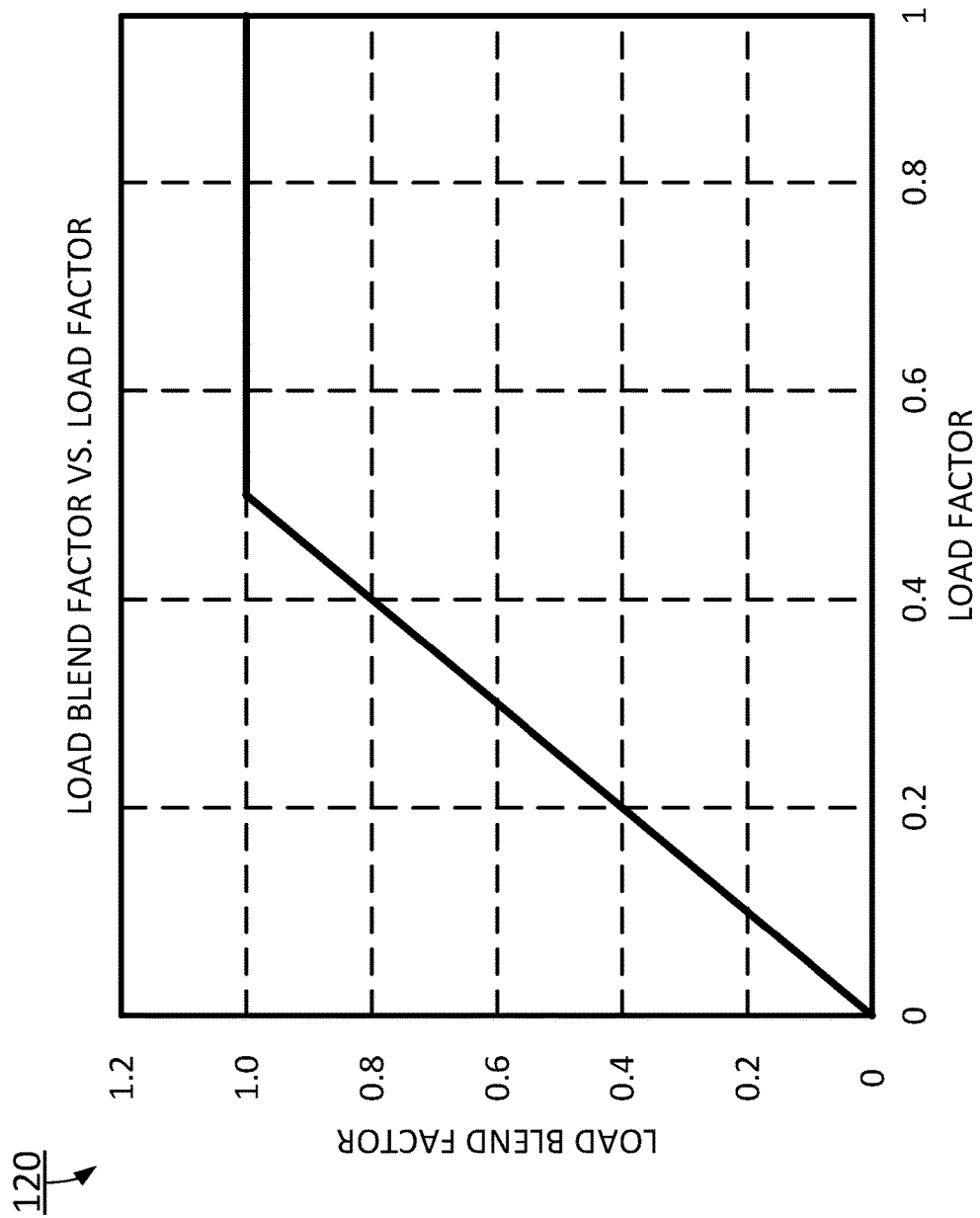
FIG. 3 is a functional curve illustrating a load blend factor vs. load factor of the payload estimation system in accordance with certain exemplary embodiments of the invention.

Referring now to FIG. 3, a functional curve illustrating a load blend factor vs. load factor of the payload estimation system 100 is shown. In certain embodiments, the additional axle load factor 1101 is input to the blend factor table 120 that calculates the load blend factor 1102 as output.

In certain embodiments, the multiple EPS signals include: a motor position 1 signal received from a power steering motor position sensor, a motor velocity 2 signal received from the EPS motor sensor 32, the handwheel torque 3 signal received from the handwheel torque sensor 31, a vehicle speed 4 signal received from one or more roadway wheel sensors, or a vehicle speed sensor mounted on a transmission of the vehicle 101, and the motor torque command 7 signal generally received from the signal combiner 170 of the payload estimation system 100.

When offset load blend factor is 0, a blended base assist 1105 equals to the blended nominal base assist 1103. When load blend factor is 1, the blended base assist 1105 equals to the blended highload base assist 1104. The motor torque command 7 may be combined with one or more additional EPS signals, such as a high frequency assist signal, and a damping signal. In some embodiments multiple blend factor tables are used to blend base assist, damping, high-frequency assist, and others.

Figure 4:
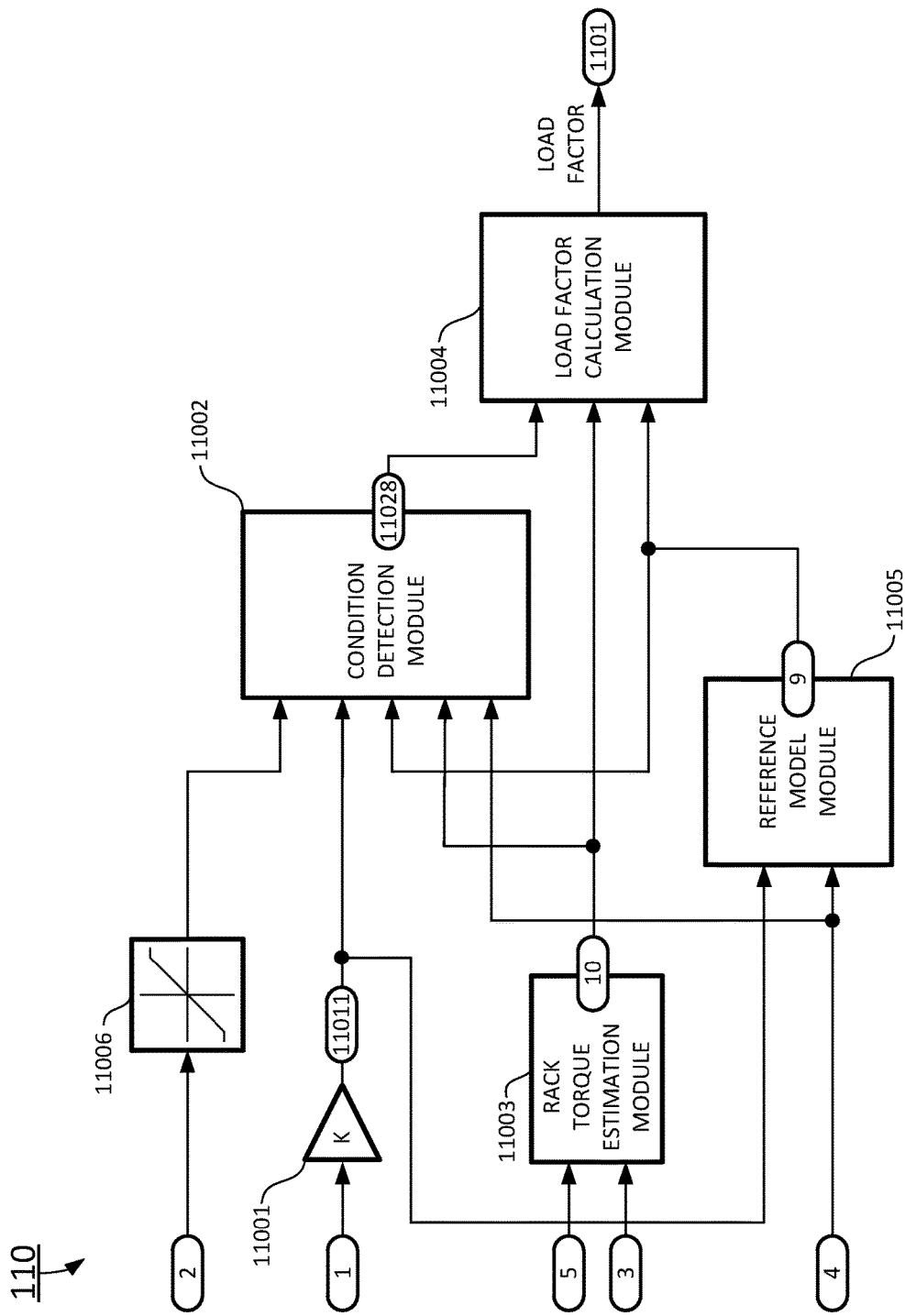
FIG. 4 is a functional block diagram illustrating a payload detection module of the payload estimation system in accordance with certain exemplary embodiments of the invention.

Referring now to FIG. 4, a functional block diagram illustrating the payload detection module 110 of the payload estimation system 100 is shown. The payload detection module 110 may include a condition detection module 11002, a rack torque estimation module 11003, a reference model module 11005, and a load factor calculation module 11004. The condition detection module 11002 generates a flag 11028 according to the multiple EPS signals. When one or more conditions are desirable to compare an estimated rack torque 10 with a reference rack torque 9, the flag 11028 is TRUE. The rack torque estimation module 11003 generates the estimated rack torque 10, and the reference model module 11005 generates the reference rack torque 9 according to a stiffness factor and an offset factor. The load factor calculation module 11004 generates the additional axle load factor 1101 based on a difference between the estimated rack torque 10 and the reference rack torque 9 and the flag 11028. In certain embodiments, the payload detection module 110 may include an amplifier 11001 to convert the motor position 1 signal to a handwheel position 11011.

Figure 5:
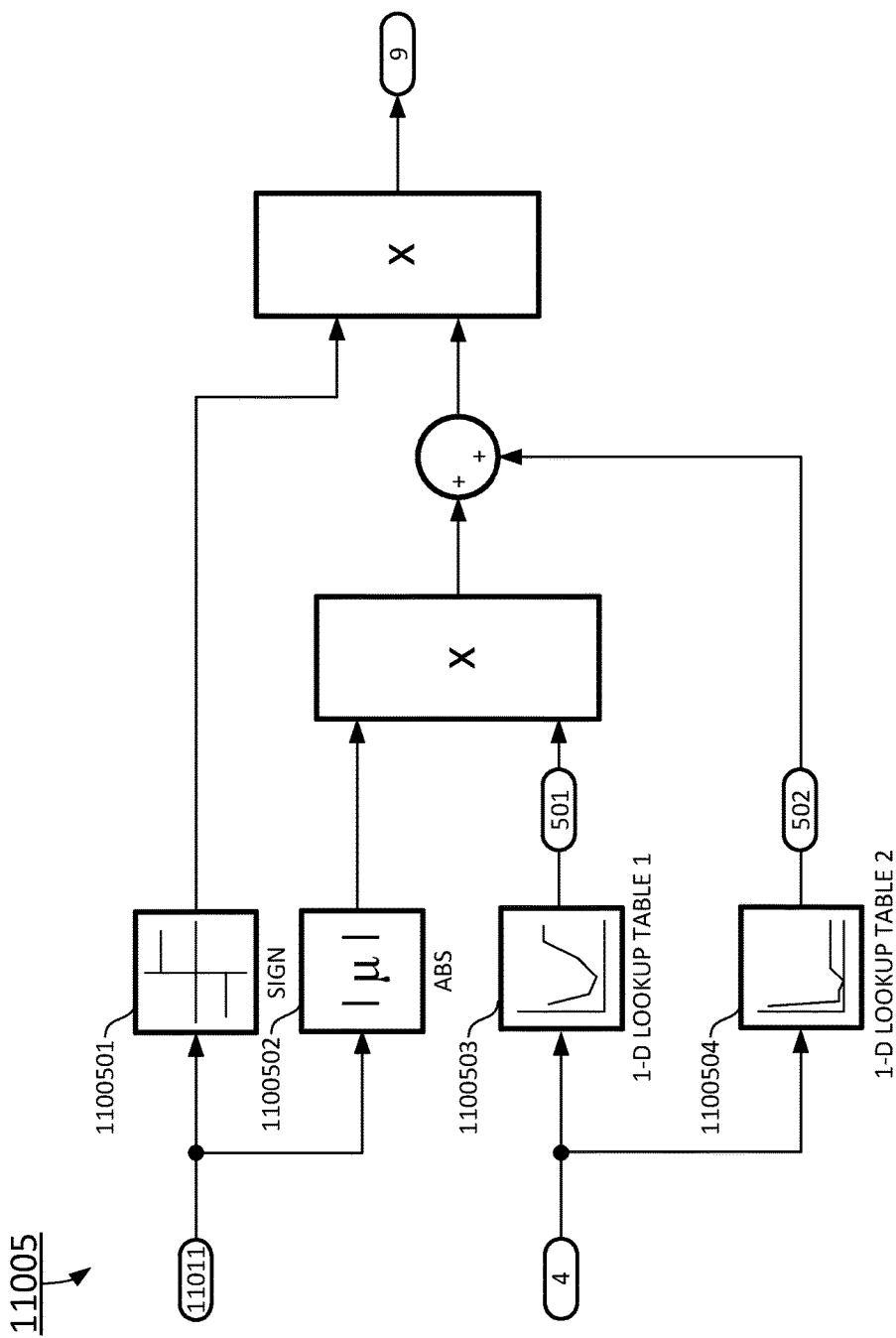
FIG. 5 is a functional block diagram illustrating a reference model module in accordance with certain exemplary embodiments of the invention.

Referring now to FIG. 5, a functional block diagram illustrating the reference model module 11005 of the payload detection module 110 is shown according to certain exemplary embodiments of the invention.

In certain embodiments, the input signals to the reference model module 11005 include the handwheel position 11011 and the vehicle speed 4. The reference model module 11005 obtains a stiffness factor 501 by a first lookup table 1100503 based on the vehicle speed 4, and obtains an offset factor 502 by a second lookup table 1100504 based also on the vehicle speed 4. The reference rack torque 9 is calculated according to following formula:

$$\text{Reference Rack Torque } 9 = K^* \text{HWPOS} + B,$$

wherein $K_{\Psi 2}$ is the stiffness factor 501, HWPOS is the handwheel position, and B is the offset factor 502.

In certain embodiments, the reference rack torque 9 may be calculated in other ways different from the calculation described herein e.g., based on vehicle model (bicycle model) based approach with different tire models.

A sign module 110501 is used to provide the reference rack torque with a corresponding sign, for example "+" or "−" based on the actual direction of the handwheel position 11011.

Figure 6:
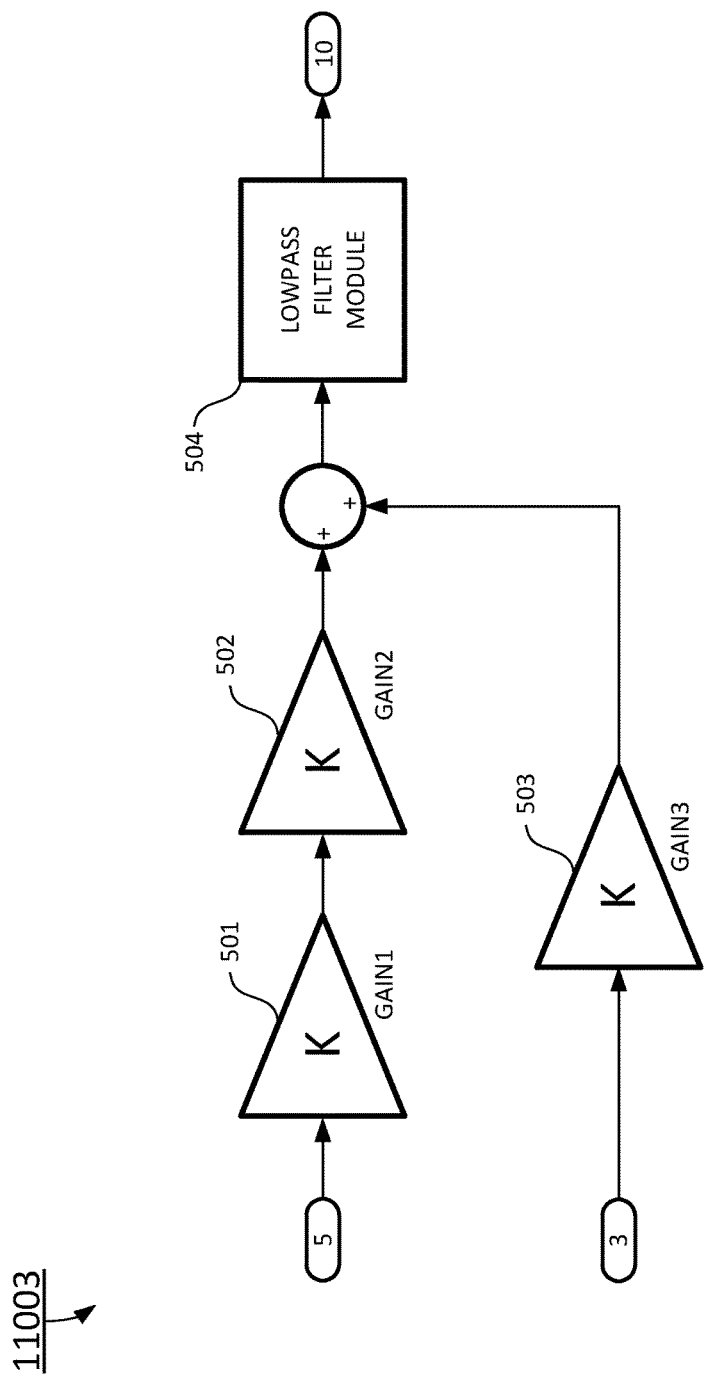
FIG. 6 is a functional block diagram illustrating an rack torque estimation module of the payload estimation system in accordance with certain exemplary embodiments of the invention.

Referring now to FIG. 6, a functional block diagram illustrating a rack torque estimation module 11003 of the payload estimation system 100 is shown according to certain embodiments of the invention.

The inputs to the rack torque estimation module 11003 include a previous motor torque command 5, and a handwheel torque signal 3. The previous motor torque command 5 is a unit time delayed motor torque command 7 through a unit time delay module 180, as shown in FIG. 2. The unit time is typically a sample time period. In one embodiment, the sample period is 1 millisecond. In another embodiment, the sample period is 2 milliseconds. The previous motor torque command 5 is converted to handwheel coordinates. Both motor torque and handwheel torque are multiplied by gear efficiencies, added, and filtered to get an estimated rack torque. In certain embodiments, an observer can be used to find rack torque acting on the EPS system.

In certain embodiments, the rack torque estimation module 11003 includes: a first amplifier 501, a second amplifier 502, a third amplifier 503, and a lowpass filter module 504. The first amplifier 501 multiplies the previous motor torque command 5 by a factor of GAIN1, which is an assist mechanical ratio. The second amplifier 502 further multiplies the previous motor torque command 5 by a factor of GAIN2, which is a motor efficiency. The third amplifier 503 multiplies the handwheel torque 3 by a factor of GAIN3, which is a handwheel efficiency. The lowpass filter module 504 filters the amplified previous motor torque command 5 combined with the amplified handwheel torque 3 to generate the estimated rack torque 10.

In certain embodiments, the estimated rack torque 10 may be calculated in other ways different from the calculation described here, e.g. based on single or multi-body based models, observers etc. These approaches may take into account additional things such as system dynamics or nonlinearities etc.

Figure 7:
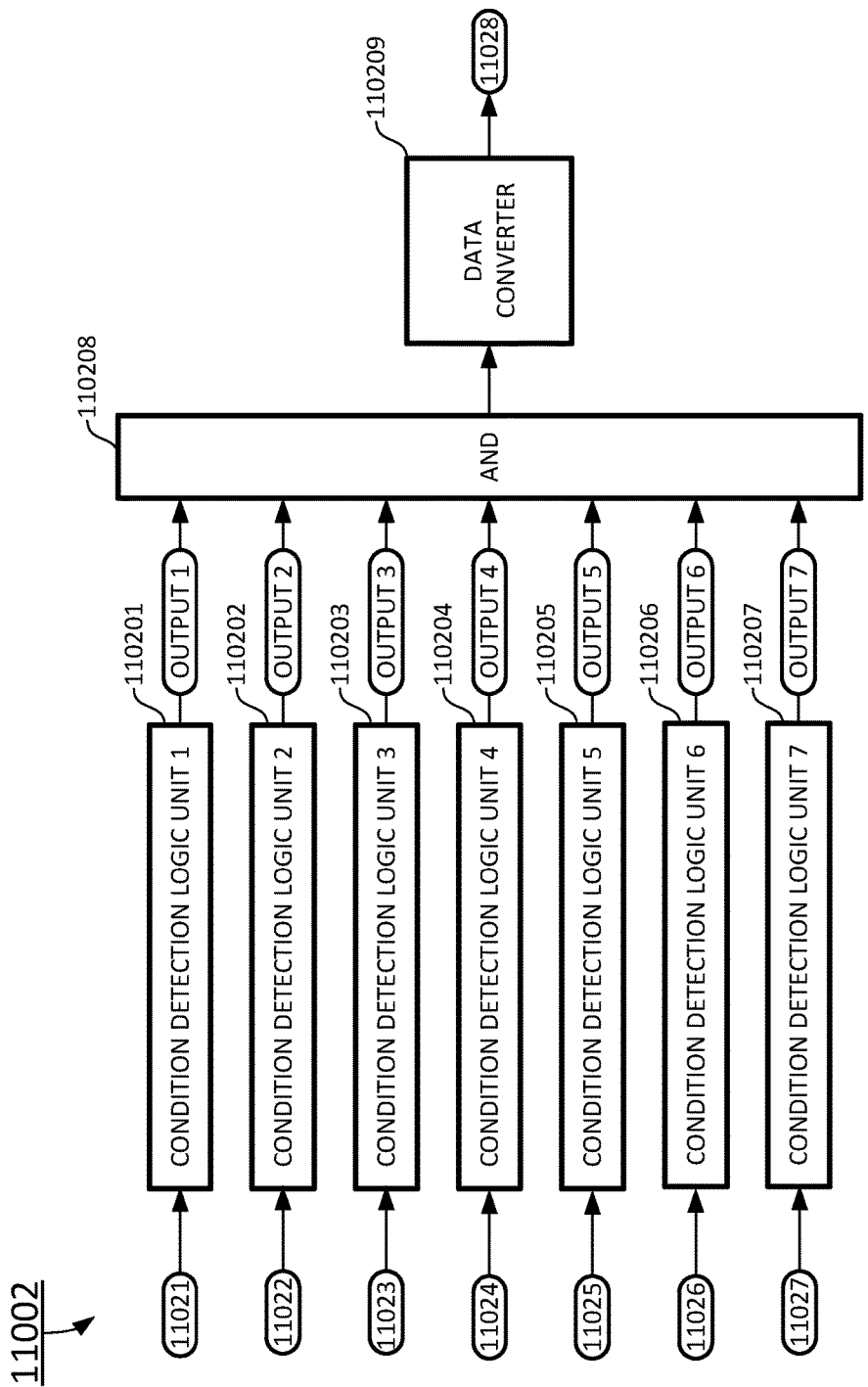
FIG. 7 is a functional block diagram illustrating an reference rack torque model of the payload estimation system in accordance with certain exemplary embodiments of the invention.

Referring now to FIG. 7, a functional block diagram illustrating a condition detection module 11002 of the payload estimation system 100 is shown according to certain exemplary embodiments of the invention.

FIG. 7 shows at least seven logic conditions going to an AND logic block 110208 to generate the flag 11028. The condition detection module 11002 includes a first condition detection logic unit 110201, a second condition detection logic unit 110202, a third condition detection logic unit 110203, a fourth condition detection logic unit 110204, a fifth condition detection logic unit 110205, a sixth condition detection logic unit 110206, a seventh condition detection logic unit 110207, the AND logic block 110208, and a data converter 110209.

In certain embodiments, the inputs to the condition detection module 11002 includes: a first input to the first condition detection logic unit 11021, a second input to the second condition detection logic unit 11022, a third input to the third condition detection logic unit 11023, a fourth input to the fourth condition detection logic unit 11024, a fifth input to the fifth condition detection logic unit 11025, a sixth input to the sixth condition detection logic unit 11026, and a seventh input to the seventh condition detection logic unit 11027.

Figure 8:
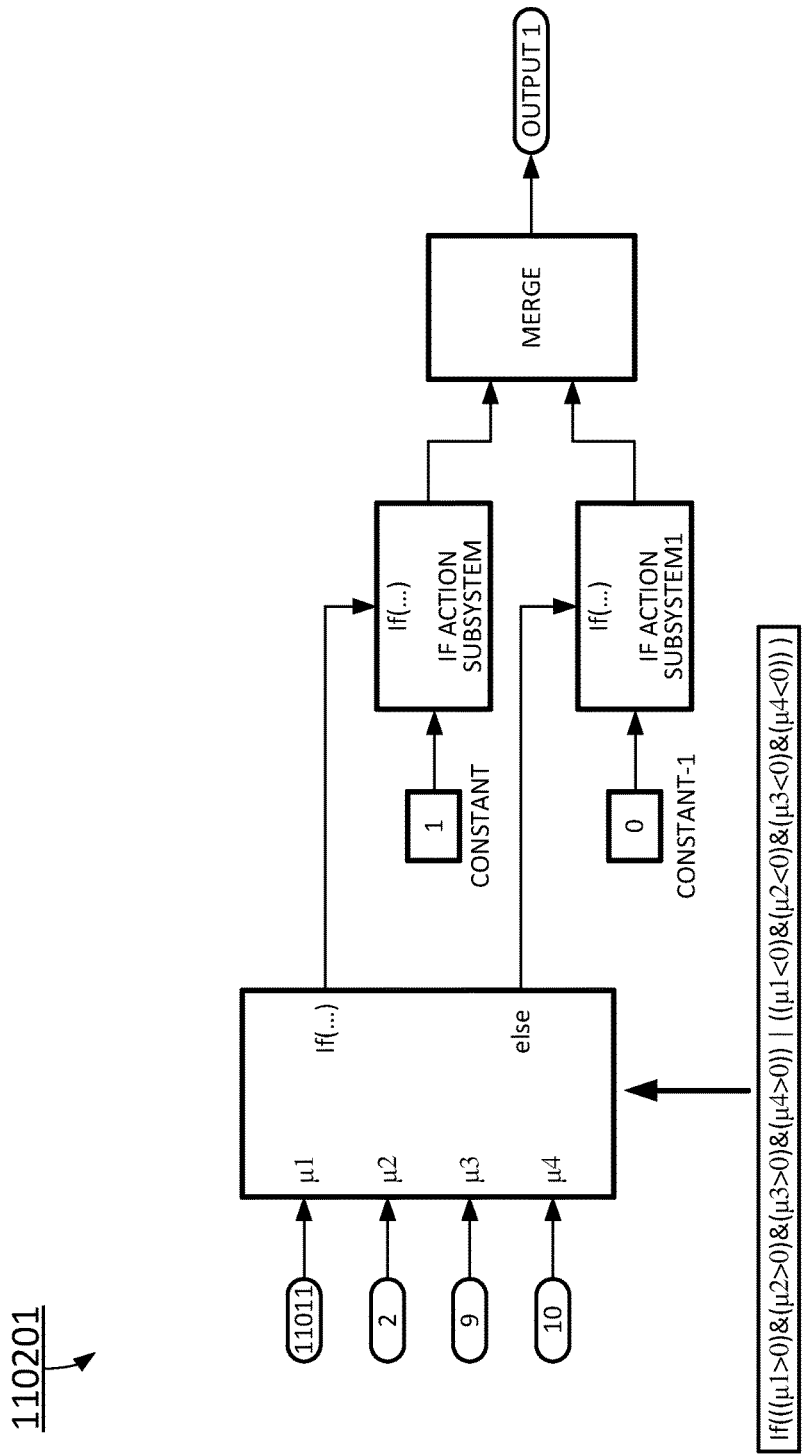
FIG. 8 is a functional block diagram illustrating a first condition detection logic unit of the reference rack torque model of the payload estimation system in accordance with certain exemplary embodiments of the invention.

FIG. 8 is a functional block diagram illustrating the first condition detection logic unit 110201 of the condition detection model 11002 of the payload estimation system 100 in accordance with certain exemplary embodiments of the invention.

The first input to the first condition detection logic unit 11021 includes: the handwheel position 11011 signal, the motor velocity 2 signal, the reference rack torque 9, and the estimated rack torque 10. An output 1 of the first input to the first condition detection logic unit 11021 is TRUE when the handwheel position 11011 signal, the motor velocity 2 signal, the reference rack torque 9, and the estimated rack torque 10 are all greater than 0, or when the handwheel position 11011 signal, the motor velocity 2 signal, the reference rack torque 9, and the estimated rack torque 10 are all less than 0.

FIG. 9 is a functional block diagram illustrating the second condition detection logic unit 110202 of the condition detection model 11002 of the payload estimation system 100 in accordance with certain exemplary embodiments of the invention.

The second input to the second condition detection logic unit 11022 includes: the motor velocity 2 signal and a condition motor velocity threshold 80. An output 2 of the second input to the second condition detection logic unit 11022 is TRUE when an absolute value of the motor velocity 2 signal is greater than or equal to condition motor velocity threshold 80.

FIG. 10 is a functional block diagram illustrating the third condition detection logic unit 110203 of the condition detection model 11002 of the payload estimation system 100 in accordance with certain exemplary embodiments of the invention.

The third input to the third condition detection logic unit 11023 includes: the handwheel position 11011, the vehicle speed 4 signal, and an absolute value of the handwheel position upper threshold 12. An output 3 of the third input to the second condition detection logic unit 11023 is TRUE when an absolute value of the handwheel position 11011 is less than or equal to the signal is greater than or equal to absolute value of the handwheel position upper threshold 12. The handwheel position upper threshold 12 is a function of the vehicle speed 4 and is determined by looking up a 1-D lookup table-2 based on the vehicle speed 4.

Figure 11:
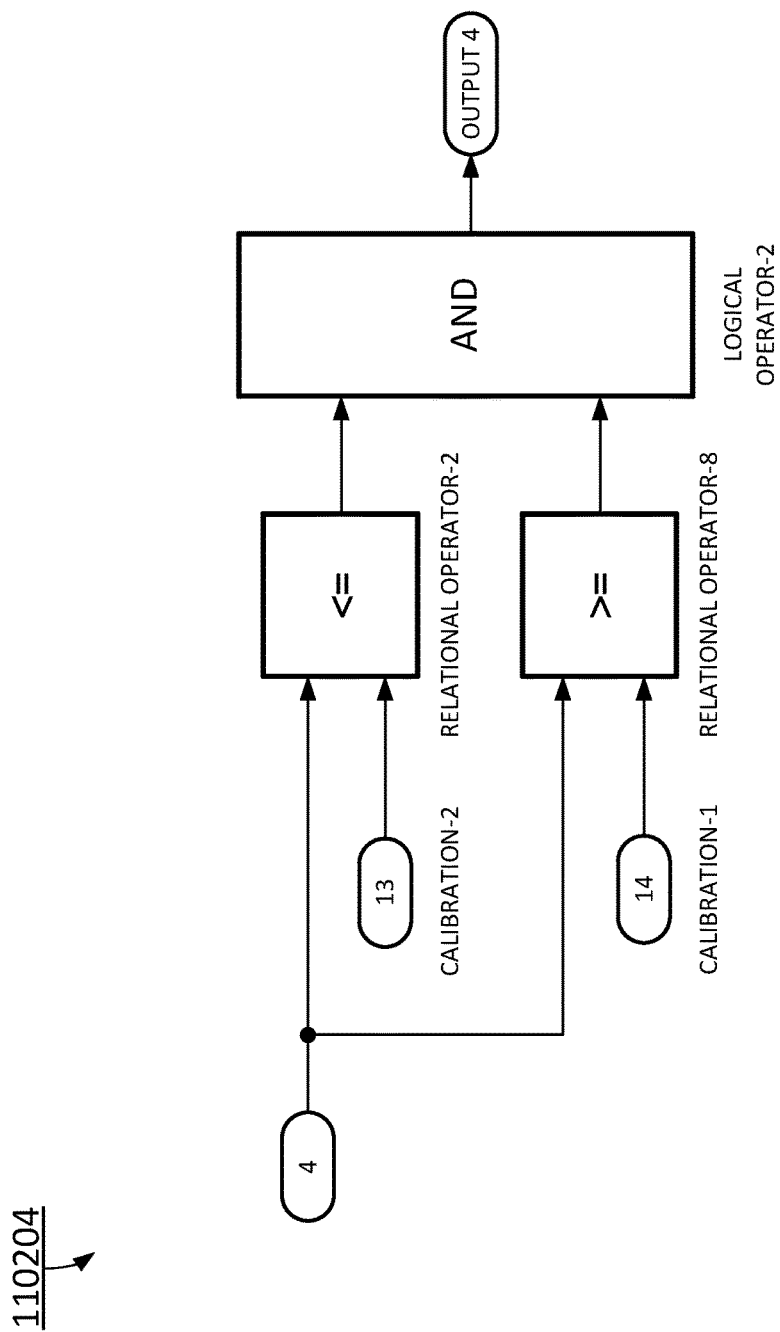
FIG. 11 is a functional block diagram illustrating a fourth condition detection logic unit of the reference rack torque model of the payload estimation system in accordance with certain exemplary embodiments of the invention.

FIG. 11 is a functional block diagram illustrating the fourth condition detection logic unit 110204 of the condition detection model 11002 of the payload estimation system 100 in accordance with certain exemplary embodiments of the invention.

The fourth input to the fourth condition detection logic unit 11024 includes: the vehicle speed 4 signal, a condition vehicle speed upper threshold 13, and a condition vehicle speed lower threshold 14. An output 4 of the fourth input to the second condition detection logic unit 11024 is TRUE when the vehicle is traveling at a speed between the condition vehicle speed upper threshold 13 and the condition vehicle speed lower threshold 14.

Figure 12:
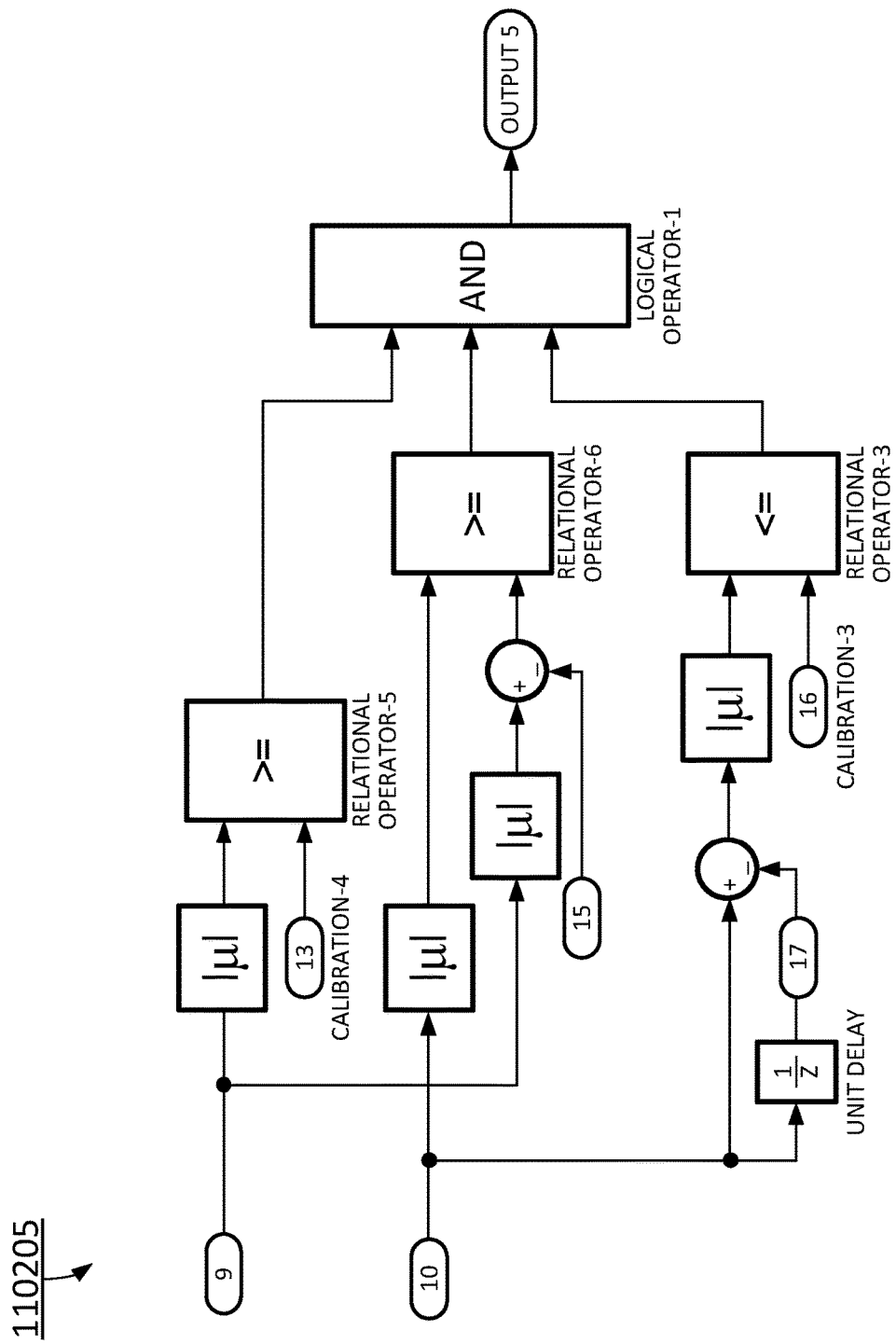
FIG. 12 is a functional block diagram illustrating a fifth condition detection logic unit of the reference rack torque model of the payload estimation system in accordance with certain exemplary embodiments of the invention.

FIG. 12 is a functional block diagram illustrating the fifth condition detection logic unit 110205 of the condition detection model 11002 of the payload estimation system 100 in accordance with certain exemplary embodiments of the invention.

The fifth input to the fifth condition detection logic unit 11025 includes: the reference rack torque 9, the estimated rack torque 10, a reference rack torque lower threshold 13, a predetermined constant delta 15, a condition delayed estimated rack torque threshold 16, and a previous estimated rack torque 17. An output 5 of the fifth input to the fifth condition detection logic unit 11025 is TRUE: (a) when the absolute value of the reference rack torque 9 is greater than or equal to a reference rack torque lower threshold 13, and (b) when an absolute value of the estimated rack torque 10 is greater than or equal to an absolute value of the reference rack torque 9 plus the predetermined constant delta 15, and (c) when an absolute value of the difference between the reference rack torque 9 and the estimated rack torque 10 is less than or equal to the condition delayed estimated rack torque threshold 16.

FIG. 13 is a functional block diagram illustrating the sixth condition detection logic unit 110206 of the condition detection model 11002 of the payload estimation system 100 in accordance with certain exemplary embodiments of the invention.

The sixth input to the second condition detection logic unit 11026 includes: the handwheel position 11011, the vehicle speed 4, and an absolute value of handwheel position lower threshold 18. An output 6 of the sixth input to the sixth condition detection logic unit 11026 is TRUE when an absolute value of the handwheel position 11011 is greater than or equal to the absolute value of handwheel position lower threshold 18. The absolute value of handwheel position lower threshold 18 is a function of the vehicle speed 4.

FIG. 14 is a functional block diagram illustrating the seventh condition detection logic unit 110207 of the condition detection model 11002 of the payload estimation system 100 in accordance with certain exemplary embodiments of the invention.

The seventh input to the second condition detection logic unit 11027 includes: the reference rack torque 9, the vehicle speed 4, and a max load rack torque 19. An output 7 of the seventh input to the seventh condition detection logic unit 11027 is TRUE, when an absolute value of the reference rack torque 9 is less than or equal to the absolute value of the max load rack torque 19. The max load rack torque 19 is also a function of the vehicle speed 4.

Figure 15:
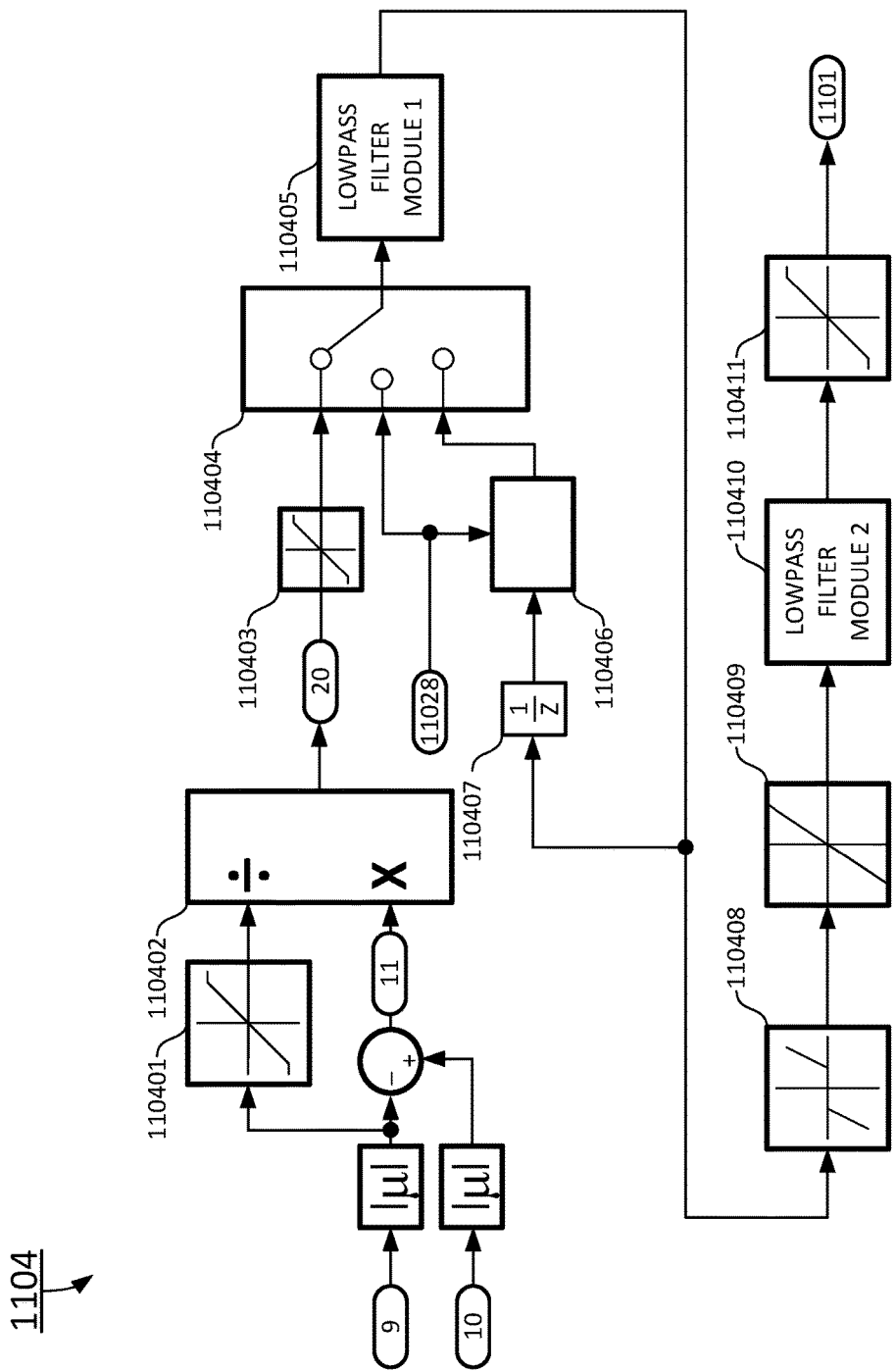
FIG. 15 is a functional block diagram illustrating an additional axle load factor calculation of the payload estimation system in accordance with certain exemplary embodiments of the invention.

Referring now to FIG. 15, a functional block diagram illustrating the load factor calculation module 11004 of the payload estimation system 100 is shown according to certain exemplary embodiments of the invention.

In certain embodiments, the load factor calculation module 11004 includes one or more of: a first saturation module 110401, a divider module 110402, a second saturation module 110403, a switch module 110404, a first lowpass filter module 110405, a falling triggered system module 110406, a time delay module 110407, a deadzone module 110408, a rate limiter 110409, a second lowpass filter module 110410, and a third saturation module 110411. The first saturation module 110401 generates a normalizing factor based on the absolute value of the reference rack torque 9. In one embodiment, the first saturation module 110401 has a lower limit of 0, and an upper limit of 1. An initial load factor 20 is a difference 11 between the estimated rack torque 10 and the reference rack torque 9 divided by the normalizing factor through a divider module 110402. The initial load factor 20 passes through the first saturation module 110403 such that the initial load factor 20 has a value between a lower limit and an upper limit. In one embodiment, the lower limit is 0.5 and the upper limit is 200. In other embodiments, the lower limit may vary between 0.1 and 5, and the upper limit may vary between 10 and 300. The initial load factor 20 passes through the second saturation module 110403 to be normalized such that the initial load factor 20 has a value between 0 and 1. The switch module 110404 selects the normalized initial load factor 20 according to the flag 11028, and a delayed filtered initial load factor 20.

In certain embodiments, an output of the triggered system module 110406 equals to the input to the triggered system module 110406 only when the flag 11028 falls from 1 to 0 (or from TRUE to FALSE). Otherwise, the output of the triggered system module 110406 is held to a predetermined constant value.

In certain embodiments, an output of the deadzone module 110408 becomes zero for inputs within a dead zone, and an input signal is offset by either the Start or End value when the input is outside of the dead zone. The rate limiter module 110409 limits rising and falling rate of change of an input signal. When an input to the rate limiter module 110409 changes too fast (i.e. high rate of change), an output rate of change of the rate limiter module 110409 is still limited based on pre-defined rising and falling rate values.

The initial load factor 20 is updated only when the flag 110208 is true. The updated load factor 20 passes through the deadzone module 110408, the rate limiter 110409, the second lowpass filter module 110410, and the third saturation module 110411 to minimize noise in the load factor calculation module 1104 to produce the additional axle load factor 1101.

In another aspect, the invention relates to a method for estimating payload estimation for maintaining consistent steering feel using electric power steering (EPS) signals.

Figure 16:
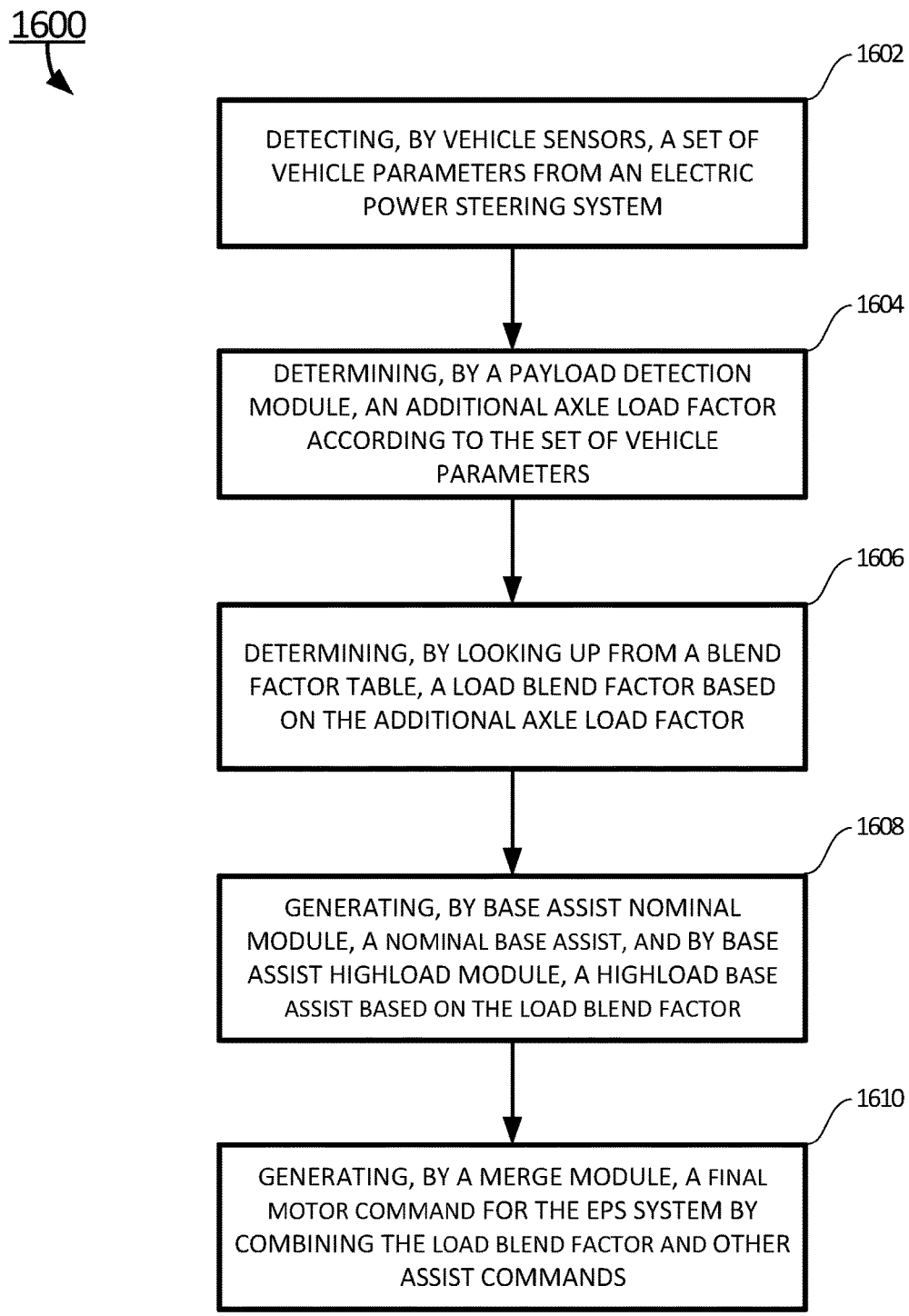
FIG. 16 is a flowchart illustrating a method of payload estimation using electric power steering signal in accordance with certain exemplary embodiments of the invention.

Referring now to FIG. 16, a flowchart illustrating a method of payload estimation using electric power steering signals is shown in accordance with certain exemplary embodiments of the invention.

At block 1602, the method includes: detecting, by multiple sensors of an electric power steering (EPS) system of a vehicle, multiple EPS signals from the EPS system.

In certain embodiments, the multiple EPS signals comprises: a motor position 1 signal received from a power steering motor position sensor, a motor velocity 2 signal received from the EPS motor velocity sensor 32, the handwheel torque 3 signal received from the handwheel torque sensor 31, a vehicle speed 4 signal received from one or more vehicle speed sensors, and a previous motor torque command 5 signal received from the EPS.

At block 1604, the method includes: receiving, by a payload detection module 110 of a payload estimation system 100, multiple signals from the EPS system to generate an additional axle load factor 1101.

In certain embodiments, the method may also include: generating, by a condition detection module 11002 of the payload detection module 110, a flag 11028 according to multiple EPS signals, when one or more conditions are desirable to compare an estimated rack torque 10 with a reference rack torque 9, the flag 11028 is TRUE, generating, by a rack torque estimation module 11003, the estimated rack torque 10, generating, by a reference model module 11005, the reference rack torque 9 according to a stiffness factor and an offset factor, and calculating, by a load factor calculation module 11004 the additional axle load factor 1101 based on a difference between the estimated rack torque 10 and the reference rack torque 9, and the flag 11028. The method may also include: converting, by an amplifier 11001 of the payload detection module 110, the motor position 1 signal to a handwheel position 11011.

In certain embodiments, the method also includes: generating the stiffness factor K according to a first lookup table based on the vehicle speed; generating the offset factor B according to a second lookup table based on the vehicle speed; and generating the reference rack torque by multiplying the stiffness factor K with the handwheel position HWPOS and adding the offset factor B.

In certain embodiments, the method may also include: multiplying, by a first amplifier 501 of the rack torque estimation module 11003, the previous motor torque command 5 by a factor of GAIN1, which is an assist mechanical ratio, multiplying, by a second amplifier 502 of the rack torque estimation module 11003, the previous motor torque command 5 by a factor of GAIN2, which is a motor efficiency, multiplying, by a third amplifier 503 of the rack torque estimation module 11003, the handwheel torque 3 by a factor of GAIN3, which is a handwheel efficiency, and filtering, by a lowpass filter module 504 of the rack torque estimation module 11003, the amplified previous motor torque command 5 combined with the amplified handwheel torque 3 to generate the estimated rack torque 10.

In certain embodiments, the method may also include: calculating an initial load factor 20, which is a difference 11 between the estimated rack torque 10 and the reference rack torque 9 divided by a normalizing factor, selecting, by a switch module 110404 of the load factor calculation module 11004, an initial load factor 20 according to the flag 110208, and a delayed load factor, updating the initial load factor 20 when the flag 110208 is TRUE, and minimizing noises in the load factor calculation module 1104 by using a deadzone module 110408, a rate limiter 110409, a second lowpass filter module 110410, and a third saturation module 110411 to produce the additional axle load factor 1101.

At block 1606, the method includes: determining, by a blend factor table 120 of the payload estimation system 100, a load blend factor 1102 according to the additional axle load factor 1101.

At block 1608, the method also includes: generating, by a first multiplier 150, a blended nominal base assist 1103 signal by combining the load blend factor 1102 and a handwheel torque 3 signal processed by a nominal base assist module 130, and generating, by a second multiplier 160, a blended highload base assist 1104 signal by combining the load blend factor 1102 and the handwheel torque 3 signal processed by a highload base assist module 140.

In certain embodiments, the blended nominal base assist 1103 is a product of the nominal base assist 11031 and an offset load blend factor 1102, which is 1 minus the load blend factor 1102. The blended highload base assist 1104 is a product of the highload base assist 11041 and the load blend factor 1102.

At block 1610, the method includes: combining, by a merge module 170, the blended nominal base assist 1103 and the blended highload base assist 1104 to generate a motor torque command 7 for the EPS system. The method may also include combining the motor torque command 7 with one or more additional EPS signals, such as a high frequency assist signal, and a damping signal.

Figure 17:
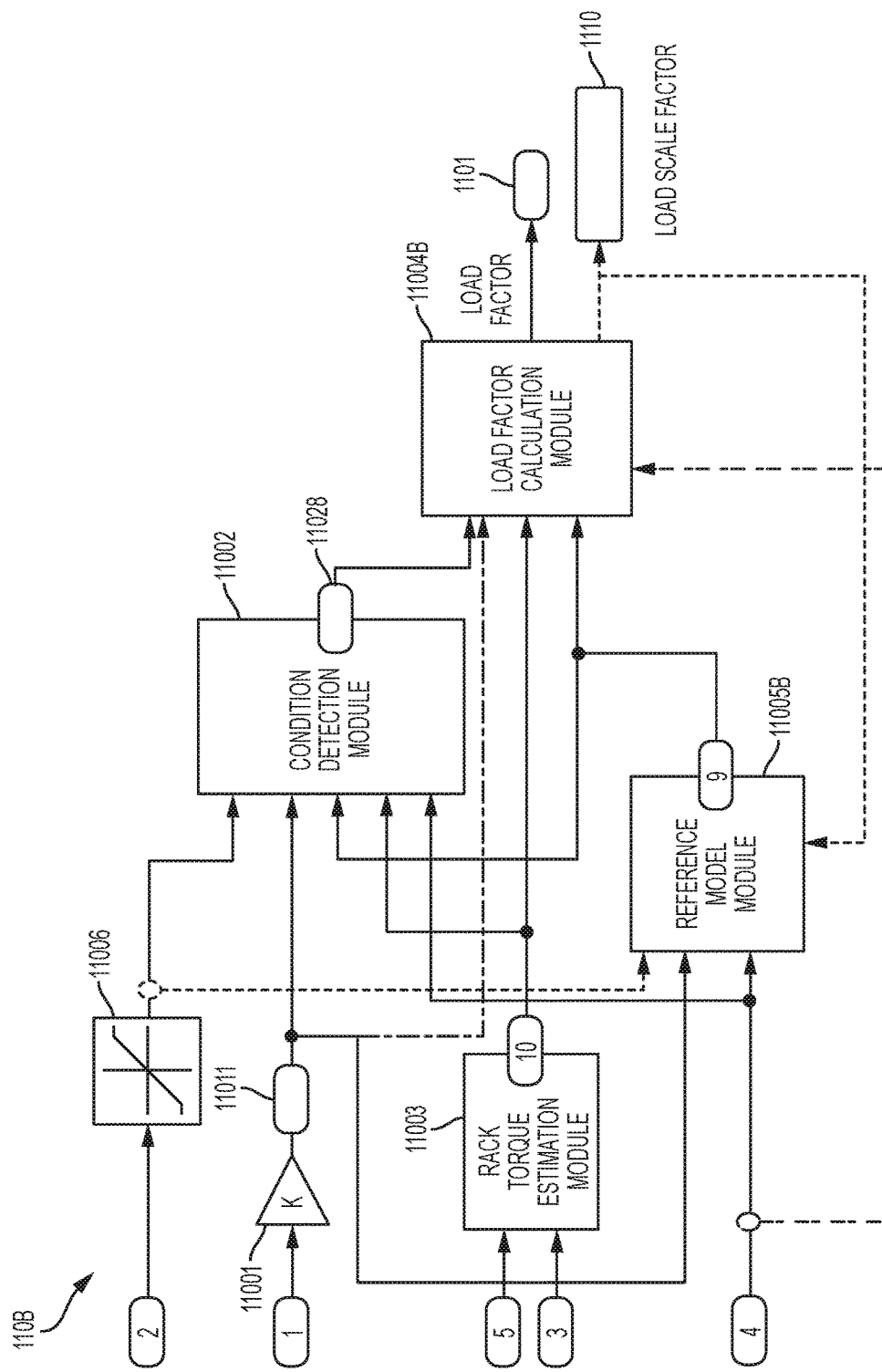
FIG. 17 is a functional block diagram illustrating a payload detection module of the payload estimation system in accordance with certain exemplary embodiments of the invention.

FIG. 17 is a functional block diagram illustrating a payload detection module of the payload estimation system in accordance with certain exemplary embodiments of the invention. The payload detection module 110B may include the condition detection module 11002, which generates the flag 11028 according to the multiple EPS signals. When one or more conditions are desirable to compare an estimated rack torque 10 with a reference rack torque 9, the flag 11028 is TRUE. In certain embodiments, the payload detection module 110B may include an amplifier 11001 to convert the motor position 1 signal to a handwheel position 11011.

The payload detection module 110B further includes the rack torque estimation module 11003, which generates the estimated rack torque 10 (see FIG. 6). It should be noted that the rack torque estimation described herein is just one example, and that in other embodiments, the estimated rack torque 10 may be calculated in other ways different from the calculation described here, e.g. based on single or multi-body model based observers, tie-rod sensors etc. These approaches may take into account additional things such as system dynamics or nonlinearities etc.

The payload detection module 110B further includes a reference model module 11005B, which generates the reference rack torque 9 according to one or more stiffness factors, wheel deflection, yaw angle of the wheel plane, and vehicle speed, among other parameters. The reference model module 11005B determines the reference rack torque 9 in a different manner compared to the reference model module 11005 (FIG. 6).

Figure 18:
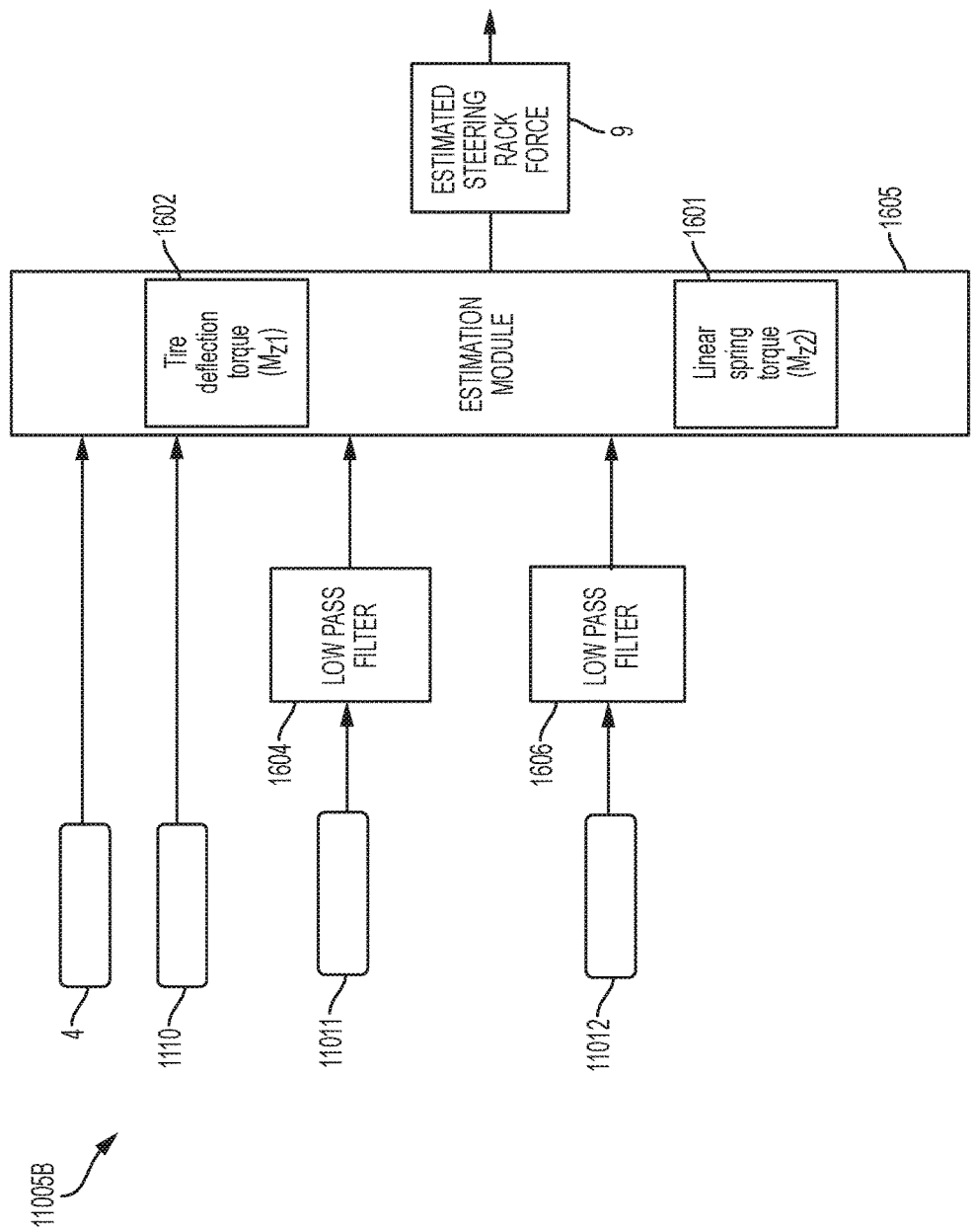
FIG. 18 is a functional block diagram illustrating a reference model module in accordance with certain exemplary embodiments of the invention.

FIG. 18 is a functional block diagram illustrating a determining a reference rack torque according to one or more embodiments of the present invention. In one or more examples, the reference model module 11005B includes a linear spring torque module 1601 and a tire deflection torque module 1602. The linear spring torque module 1601 computes a torque caused by a linear spring effect ($M_{z2}$) using the stiffness factor 501, the offset factor 502, and the vehicle speed 4. The tire deflection torque module 1602 computes a torque caused by a tire deflection ($M_{z1}$). In one or more examples, the final reference rack torque 9 output by the reference model module 11005B is a sum of the two torques computed, $M_{z1}$ and $M_{z2}$.

In one or more examples, the linear spring torque module 1601 computes the linear spring torque $M_{z2}$ using the following equation, $$M_{z2} = K_{\Psi 2} \cdot \Psi \qquad (5)$$

where $K_{\Psi 2}$ is the stiffness factor 501, and $\Psi$ is a yaw angle of the wheel plane.

In one or more examples, the tire deflection torque module 1602 utilizes a modified static tire model to estimate the tire deflection rack torque. A static tire model for estimating hand wheel torque is described in van der Jagt, Pim, "Prediction of Steering Efforts During Stationary or Slow Rolling Parking Maneuvers," Ford Forschungszentrum Aachen GmbH., Oct. 27, 1999, which is incorporated herein by reference in its entirety. This static tire model is referred to as "Van der Jagt static tire model" in the present disclosure. The tire deflection torque module 1602 utilizes a modified Van der Jagt static model to estimate the hand wheel torque, and in turn the tire deflection torque.

The modified Van der Jagt static model includes the following equation for estimating tire deflection torque $M_{z1}$ that is caused by the tire and the surface of the ground with which the tire is in contact:

$$M_{z1} = LS \cdot K_{\Psi} \cdot \Psi_{def} \qquad \text{(Equation 1)}$$

where $K_{\Psi}$ is the torsional stiffness of the tire; $\Psi_{def}$ is the torsional deflection of the tire; and LS is a load scale factor that is computed by module 11004B. Different tires have different torsional stiffness.

The modified Van der Jagt static model further includes the following two equations:

$$\dot{\Psi}_{def} = (1 - |M_{z1}/LS \cdot M_{z\,max}|) \cdot \dot{\Psi} \text{ if } \text{sign}(\Psi_{def}) = \text{sign}(\dot{\Psi}) \qquad \text{(Equation 2)}$$

$$\dot{\Psi}_{def} = \dot{\Psi} \text{ if } \text{sign}(\Psi_{def}) \neq \text{sign}(\dot{\Psi}) \qquad \text{(Equation 3)}$$

where $\dot{\Psi}$ is a time derivative of the yaw angle $\Psi$ of the wheel plane; $\Psi_{def}$ is the torsional deflection (i.e., deformation angle) of the tire as the hand wheel rotates; $\dot{\Psi}_{def}$ is a time derivative of $\Psi_{def}$; $M_{z\,max}$ is the maximum torque that can be generated by the tire; and sign( ) is a function that returns the sign (e.g., a positive and a negative) of the input value. Equation 2 defines the time derivative $\dot{\Psi}_{def}$ of torsional deflection $\Psi_{def}$ of the tire when the sign of $\Psi_{def}$ is the same as the sign of the time derivative of the yaw angle $\Psi$ (i.e., when the direction of the deflection of the tire and the direction of the yaw angular velocity of the wheel plane are the same). Equation 3 defines the time derivative $\dot{\Psi}_{def}$ of torsional deflection $\Psi_{def}$ of the tire when the sign of $\Psi_{def}$ is the same as the sign of the time derivative of the yaw angle $\Psi$ (i.e., when the direction of the deflection of the tire and the direction of the yaw angular velocity of the wheel plane are opposite). Equations 2 and 3 show nonlinearities between the steering rack force and the hand wheel angle.

The modified Van der Jagt static model further includes the following equations for estimating the steering rack force when the vehicle is stationary:

$$\Psi_{defmax} = LS \cdot M_{z\,max}/K_{\Psi} \qquad \text{(Equation 4)}$$

$$\Psi_{def,0} = \int_0^t (\dot{\Psi}_{def} + \dot{\Psi}_{def2}) \cdot \partial t \qquad \text{(Equation 5)}$$

$$\Psi_{def} = \text{sign}(\Psi_{def,0}) \cdot \min(\Psi_{defmax}, |\Psi_{def,0}|) \qquad \text{(Equation 6)}$$

where $\Psi_{defmax}$ is the maximum possible deflection of the tire. Equation 4 shows that the maximum possible deflection of the tire before the tire starts to slip may be calculated by dividing the maximum torque that can be generated by the tire by the torsional stiffness of the tire. Equation 5 shows that the deflection of the tire builds up as the hand wheel rotates. Further, $$\dot{\Psi}_{def2} = -\frac{1}{\tau}\Psi_{def}, \text{ where } \tau = X_{rel}/(v)$$

where $X_{rel}$ is a tire relaxation length, and v is the vehicle speed 4.

Here, $\tau$ is a time constant; $\dot{\Psi}_{def2}$ is a time derivative of $\Psi_{def}$; $X_{rel}$ is the tire relaxation length. In the Van der Jagt model, it is assumed that the tire has about two thirds of the steady state values (e.g., torsional stiffness and torsional deflection of the tire when the vehicle is stationary) after the tire has rolled over the tire relaxation length. Accordingly, $\tau$ indicates that at time $\tau$ the tire has about two thirds of its steady state value.

Further, referring back to FIG. 18, in some embodiments, the reference model module 11005B includes one or more sub-modules and datastores, such as low pass filters 1604 and 1606. Specifically, the low pass filters 1604 and 1606 filter the hand wheel angle signal 11011 and a hand wheel velocity signal 11012, respectively. The low pass filters 1604 and 1606 remove noise from the hand wheel angle signal 11011 and the hand wheel velocity signal 11012 and add a time delay to the hand wheel angle signal 11011 and the hand wheel velocity signal 11012. This time delay makes the estimation of the tire deflection torque $M_{z1}$ more accurate because the delay synchs up the phases of the hand wheel angle signal 11011 and the hand wheel velocity signal 11012 with the motion of the tire. The motion of the hand wheel precedes the motion of the tire because the motion of the tire is caused by the motion of the hand wheel.

The tire deflection torque module 1605 modifies the Van der Jagt static tire model by replacing the tire steering coordinates in the above equations of the Van der Jagt static tire model with the hand wheel angle values, the hand wheel velocity values and the vehicle velocity values. For instance, the hand wheel angle is used instead of the yaw angle $\Psi$ of the wheel plane for the tire, and the hand wheel velocity is used instead of the time derivative $\dot{\Psi}$ of the yaw angle $\Psi$ of the wheel plane. Further, the modified tire model uses the load scale factor (LS) 1110, in the form of a feedback, for the computations of $M_z$ per the equations described herein.

Referring back to FIG. 17, the payload detection module 110B further includes a load factor calculation module 11004B, which computes the load factor 1101 and the load scale factor (LS in the above equations) 1110.

Figure 19:
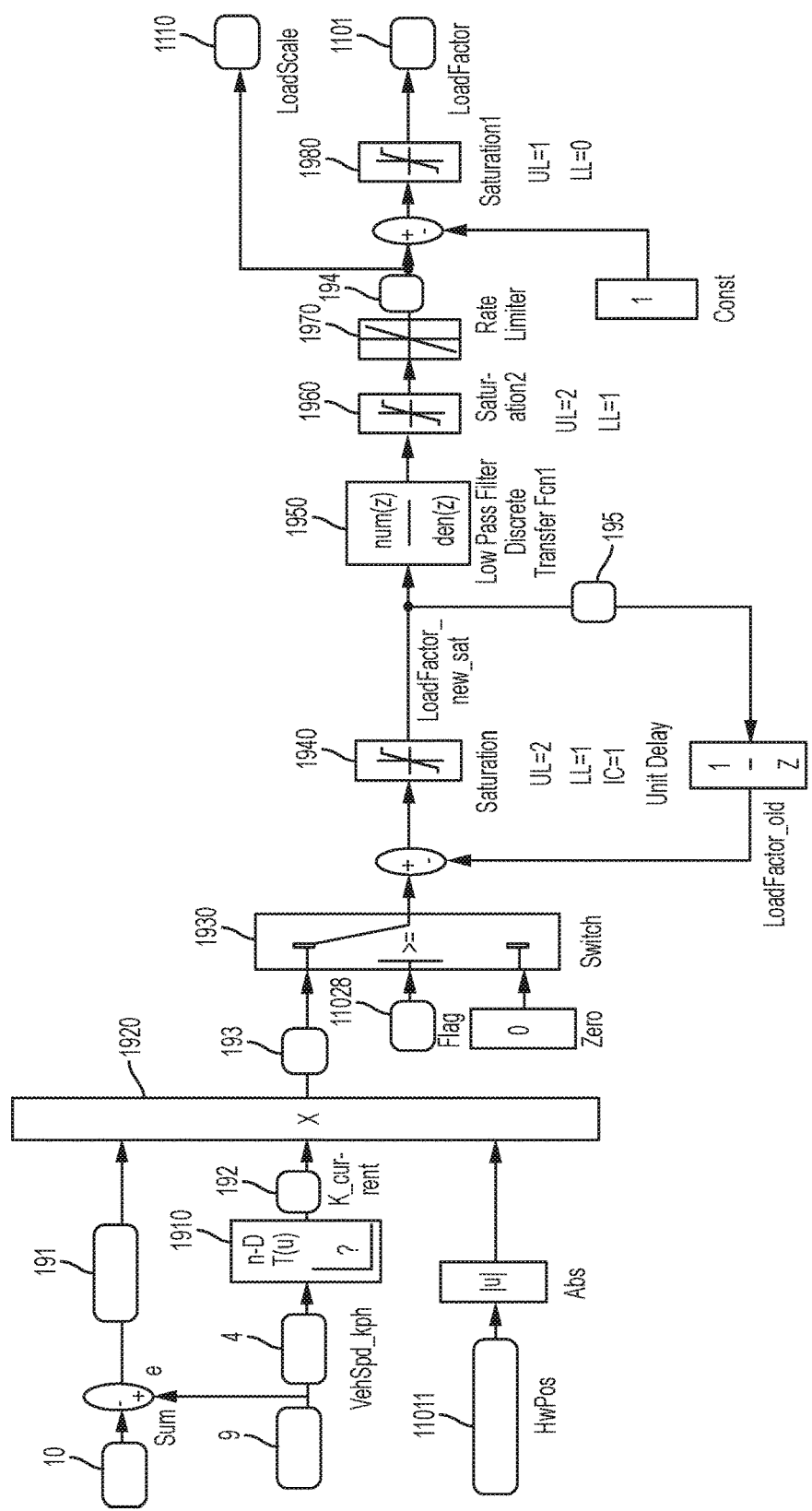
FIG. 19 is a functional block diagram illustrating the load factor calculation module in accordance with certain exemplary embodiments of the invention.

FIG. 19 is a functional block diagram illustrating the load factor calculation module 11004B in accordance with certain exemplary embodiments of the invention. An initial rack torque error 191 is a difference between the estimated rack torque 10 and the reference rack torque 9. In one or more examples, the initial rack torque error 191 may be normalized, such as using a normalizing module 110402. Further, the initial rack torque error 191 is multiplied, by a multiplier 1920, with an absolute value of handwheel position 11011 and a vehicle speed factor 192 that is determined using a look-up table 1910 and the vehicle speed 4. The output 193 of the multiplier 1920 is forwarded to a switch 1930.

For example, the output 193 is updated only when the flag 11028 is true. The output 193 passes through a saturation module 1940 which limits the output to an upper limit (such as 2) and a lower limit (such as 1). The result from the saturation module 1940 is further passed through a lowpass filter 1950, a first saturation module 1960, and a first rate limiter module 1970.

In one or more examples, the output 195 from the saturation module 1940 is unit delayed and added into the present input to the saturation module 1940.

The rate limiter output 194 is limited using a second saturation module 1980, the output being the load factor 1101 (or additional axle load factor). Further, the rate limiter output 194 is subtracted from a constant, such as 1, to generate the load scale factor (LS) 1110.

The load factor 1101 and the load scale factor 1110 are used for adjusting the assist torque as described herein.

Figure 20:
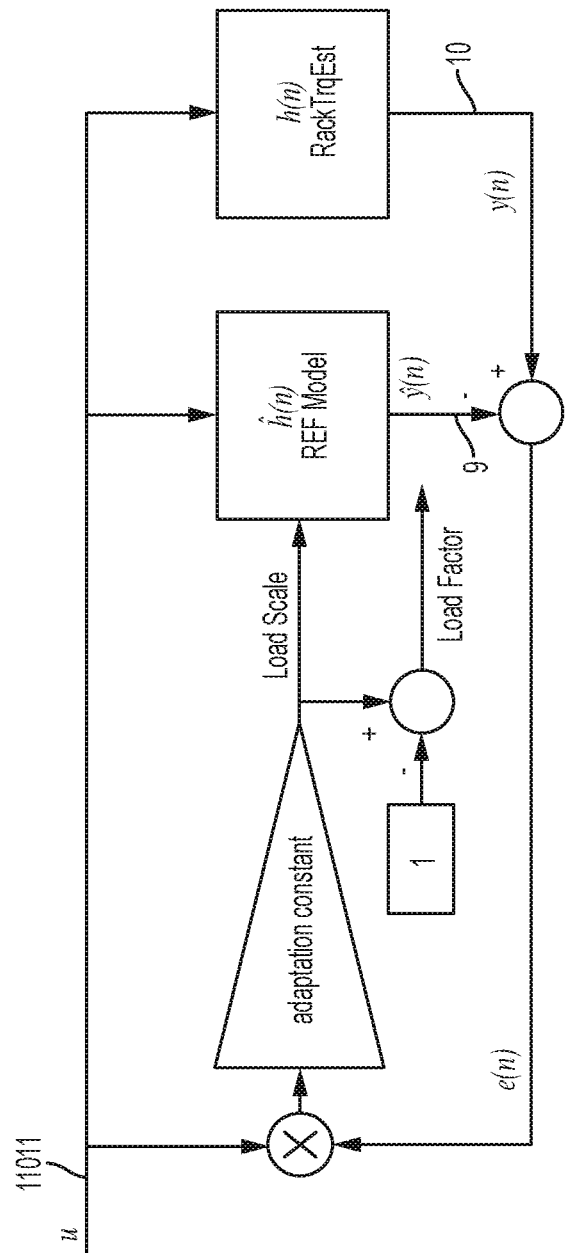
FIG. 20 depicts an operational block diagram of the payload detection module in accordance with a least means square technique used in certain exemplary embodiments of the invention.

The payload detection module 110B (FIG. 17) thus implements a least means square (LMS) algorithm to predict the load factor. FIG. 20 depicts an operation block diagram of the LMS algorithm implementation by the payload detection module 110B. As described herein, the reference rack torque is computed by the reference model module 11005B using a tire model. Then load scale is calculated as the product of input (handwheel position) 11011, the difference of the estimated rack torque 10 and the reference rack torque 9. The load scale 1110 is feedback to the reference model 11005B to adjust the value of reference rack torque 9 for the next loop. Through adjusting the value of load scale factor 1110, the reference rack torque 9 tends to equal to estimated rack torque 10. The value of load scale factor 1110 reflects the payload change compared to the nominal condition (No load).

The LMS algorithm for a pth order algorithm can be summarized as following: The value of output (load factor) is continuously modified based on the update of $\hat{h}(n+1)$ and it is updated every loop. The update algorithm for reference rack torque 9, i.e., $\hat{h}(n+1)$ is based on its previous value, $\hat{h}(n)$ adaptation constant μ, input (handwheel position 11011) and error (the difference between rack torque estimation 10 and reference rack torque 9). An adaptation constant μ is used to control the rate of convergence of this algorithm. This adaptation constant may be based on the vehicle speed.

Parameters: p=filter order
μ=step size
Initialisation: $\hat{h}(0)$=zeros(p)
Computation: For n=0, 1, 2, . . .

$$x(n)=[x(n),x(n-1),\ldots,x(n-p+1)]^T.$$

$$e(n)=d(n)-\hat{h}^H(n)x(n)$$

$$\hat{h}(n+1)=\hat{h}(n)+\mu e^*(n)x(n)$$

The technical solutions described herein thus address the technical challenges caused by increased normal load on each tire of a vehicle resulting in increased kingpin torque (and hence increased rack load) compared to the nominal load condition configured for a steering system. Typically, such increased payload (weight in the vehicle) results in increased effort required by the vehicle operator to steer the vehicle, resulting in complaints from vehicle operators of, for example, delivery vans, that the steering effort is not consistent when the payload is changed.

As described herein the technical solutions described herein address the technical challenges by estimating or determining an additional axle load factor based on payload detection using steering system signals. This payload detection is then used to blend between, for example, two assist tables—one designed for nominal loading, the other for fully-loaded (or highload). In one or more examples, the fully-loaded assist table may provide additional assist torque so that there is less variation in required driver effort when there are payload changes.

In one or more examples, the dynamic payload detection uses only steering system and existing vehicle signals, resulting in a low-cost solution. The dynamic payload detection and adjustment to the steering system parameters to adjust the assist torque is an improvement over typical techniques of offline adjustment of the steering system by measuring vehicle payload by driving the vehicle onto weighing scales, then comparing the load to predetermined nominal loads, and then manually adjusting the steering system parameters. This, however, is not practical, as vehicle scales are not readily available. Further, payload changes in-between visits to the vehicle scales still result in operator discomfort. Finally, the result from vehicle scales are not directly influencing the EPS tuning parameters. Thus, the technical solutions described herein improve the steering system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A payload estimation system of an electric power steering (EPS) system comprising:
    a payload detection module configured to detect payload according to a plurality of EPS signals and generate an axle load factor, the payload detection module comprising:
        a rack torque module configured to determine a rack torque acting on a rack connected with the EPS;
        a reference model module configured to determine a reference rack torque for the EPS based on a load scale factor; and
        a load factor calculation module configured to compute an axle load factor based on a difference between the rack torque and the reference rack torque;
    a blend factor module configured to determine a load blend factor according to the axle load factor;
    a nominal base assist module configured to determine a nominal base assist based on a handwheel torque signal; and
    a highload base assist module configured to generate a highload base assist based on the handwheel torque; and
    a signal combiner configured to combine a blended nominal base assist and a blended highload base assist according to the load blend factor, the combination modifying a motor torque command, the motor torque command being sent to a motor to generate assist torque, wherein the blended nominal base assist includes the nominal base assist multiplied by an offset load blend factor, wherein the offset load blend factor comprises 1 minus the load blend factor, and the blended highload base assist comprises the highload base assist multiplied by the load blend factor.

2. The payload estimation system of claim 1, further comprising:

a condition detection module configured to generate a flag in response to one or more operating conditions being satisfied, wherein the rack torque is compared with the reference rack torque in response to the flag being indicative of the conditions being satisfied.

3. The payload estimation system of claim 1, wherein the reference rack torque is calculated as a sum of a linear spring torque and a tire deflection torque using handwheel position, wherein the tire deflection torque is computed based on the axle load factor.

4. The payload estimation system of claim 1, the load factor calculation module further comprising:
a multiplier module configured to compute a product of handwheel position, a vehicle speed factor, and an initial rack torque error, which is a difference between the rack torque and the reference rack torque, for computing the axle load factor.

5. The payload estimation system of claim 2, wherein the rack torque module comprises:
a first amplifier configured to increase a previous motor torque command by a factor of GAIN1, wherein the GAIN1 comprises an assist mechanical ratio;
a second amplifier configured to further increase the previous motor torque command by a factor of GAIN2, wherein the GAIN2 comprises a motor efficiency;
a third amplifier configured to increase a handwheel torque by a factor of GAIN3, wherein the GAIN3 comprises a handwheel efficiency; and
a lowpass filter module configured to filter the amplified previous motor torque command combined with the amplified handwheel torque to determine the rack torque.

6. The payload estimation system of claim 2, wherein the load factor calculation module is configured to:
calculate a difference between the rack torque and the reference rack torque; and
a switch module configured to compute the axle load factor using the difference in response to the flag being TRUE.

7. The payload estimation system of claim 1 wherein the load factor calculation module further comprises a plurality of conditioning modules configured to minimize noise of the axle load factor, the plurality of conditioning modules comprising:
a saturation module configured to condition an initial rack torque error;
a rate limiter module configured to limit the initial rack torque error to a first predetermined range;
a lowpass filter module configured to minimize the noise; and
a saturation module to limit the axle load factor to a second predetermined range.

8. A method of estimating a payload for maintaining a substantially consistent steering feel produced at least in-part by an electric power steering (EPS) system, the method comprising:
receiving, by a payload detection module of a payload estimation system, a plurality of EPS signals to generate an additional axle load factor;
determining, by a reference model module, a reference rack torque for the EPS based on a load scale factor;
computing, by a load factor calculation module, an axle load factor based on a difference between the rack torque and the reference rack torque;
determining, by a blend factor table of the payload estimation system, a load blend factor according to the additional axle load factor; and modifying, by a merge module, a motor torque command based on the load blend factor, the motor torque command being sent to a motor of the EPS to generate assist torque.

9. The method of claim 8, wherein modifying the motor torque command further comprises:
generating, by a first multiplier, a blended nominal base assist signal by combining the load blend factor and a handwheel torque signal;
generating, by a second multiplier, a blended highload base assist signal by combining the load blend factor and the handwheel torque signal; and
combining, by a merge module, the blended nominal base assist and the blended highload base assist to modify the motor torque command.

10. The method of claim 9, wherein the blended nominal base assist comprises the nominal base assist multiplied by an offset load blend factor, wherein the offset load blend factor comprises 1 minus the load blend factor, and the blended highload base assist comprises the highload base assist multiplied by the load blend factor.

11. The method of claim 8, wherein computing the load factor further comprises computing a product of handwheel position, a vehicle speed factor, and an initial rack torque error, which is a difference between the rack torque and the reference rack torque.

12. The method of claim 8, further comprising:
detecting, by a condition detection module, one or more conditions being desirable to compare the rack torque with the reference rack torque, and calculating, by the load factor calculation module the additional axle load factor in response to a flag being indicative of the desirable conditions.

13. The method of claim 8, wherein generating the reference rack torque comprises:
computing a linear spring torque;
computing a tire deflection torque based on the axle load factor; and
adding the linear spring torque and the tire deflection torque.

14. A steering system comprising:
a rack torque module configured to determine a rack torque acting on a rack connected with the steering system;
a reference model module configured to determine a reference rack torque for the steering system according to a plurality of control signals;
a payload detection module configured to compute an axle load factor based on a difference between the rack torque and the reference rack torque; and
a signal combiner configured to modify a motor torque command based on the axle load factor, the motor torque command being sent to a motor of the steering system to generate assist torque.

15. The steering system of claim 14, wherein:
the payload detection module is further configured to compute a load scale factor based on the axle load factor; and
the reference model module computes the reference rack torque based on the load scale factor received after a unit delay.

16. The steering system of claim 14, wherein the reference model module further comprises:
a linear spring torque module configured to compute a linear spring torque using handwheel position; and a tire deflection torque module configured to compute a tire deflection torque using handwheel position and the axle load factor according to a tire model; and wherein, the reference rack torque is calculated as a sum of the linear spring torque and the tire deflection torque.

17. The steering system of claim 14, wherein the axle load factor is computed in response to a motor velocity of the motor of the steering system being above a predetermined threshold.

18. The steering system of claim 14, computing the load factor further comprises computing a product of handwheel position, a vehicle speed factor, and an initial rack torque error, which is a difference between the rack torque and the reference rack torque.

* * * * *